United States Patent
Mafune

(10) Patent No.: US 7,788,001 B2
(45) Date of Patent: Aug. 31, 2010

(54) NAVIGATION SYSTEM AND METHOD, AND COMPUTER PROGRAM PRODUCT

(75) Inventor: Hiroyuki Mafune, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/389,210

(22) Filed: Feb. 19, 2009

(65) Prior Publication Data

US 2009/0157299 A1 Jun. 18, 2009

Related U.S. Application Data

(63) Continuation of application No. 10/895,105, filed on Jul. 21, 2004, now Pat. No. 7,518,533.

(30) Foreign Application Priority Data

Jul. 22, 2003 (JP) ............................. 2003-200065

(51) Int. Cl.
*G01C 21/26* (2006.01)
*G01C 21/34* (2006.01)

(52) U.S. Cl. ........................... 701/25; 701/24; 701/202; 701/209; 726/19; 340/995.19; 340/995.23

(58) Field of Classification Search ................ 701/200, 701/202, 207, 209; 340/995.19, 995.23
See application file for complete search history.

(56) References Cited

U.S. PATENT DOCUMENTS

| 6,209,026 | B1 | 3/2001 | Ran et al. | |
|---|---|---|---|---|
| 6,408,243 | B1 | 6/2002 | Yofu | |
| 6,708,108 | B2 * | 3/2004 | Jones | 701/200 |
| 2002/0051011 | A1 | 5/2002 | Goto | |
| 2002/0165666 | A1 * | 11/2002 | Fuchs et al. | 701/209 |
| 2003/0028322 | A1 * | 2/2003 | Ogawa | 701/213 |
| 2003/0060232 | A1 | 3/2003 | Hashimoto et al. | |
| 2003/0060974 | A1 * | 3/2003 | Miyahara et al. | 701/209 |
| 2003/0079135 | A1 | 4/2003 | Jones | |
| 2003/0083851 | A1 | 5/2003 | Nagamune | |

(Continued)

FOREIGN PATENT DOCUMENTS

DE 196 11 915 A1 10/1997

(Continued)

*Primary Examiner*—Thomas G Black
*Assistant Examiner*—Lin B Olsen
(74) *Attorney, Agent, or Firm*—Young & Thompson

(57) ABSTRACT

A navigation system (500) is provided with: a navigation apparatus (510); a server apparatus (520) and a route information transmittance apparatus (530), which are inter-communicable via a communication network (540). The route information transmittance apparatus is provided with: an input device (531) for inputting route search information indicating an instruction of a route search; and a transmittance device (532) for transmitting the route search information to the server apparatus. The server apparatus is provided with: a server side communication device (521) for receiving the route search information; an authentication device (522) for authenticating whether or not the route search information is available; and a search device (523) for performing the route search on the basis of the authenticated route search information. The server side communication device transmits search result information indicating a searched route to the navigation apparatus. The navigation apparatus is provided with: a terminal side communication device (511) for receiving the search result information; and a route guidance device (512) for performing a route guidance on the basis of the search result information.

13 Claims, 16 Drawing Sheets

U.S. PATENT DOCUMENTS

| | | |
|---|---|---|
| 2003/0191580 A1 | 10/2003 | Endo et al. |
| 2004/0066330 A1* | 4/2004 | Knockeart et al. ..... 342/357.07 |
| 2004/0158395 A1 | 8/2004 | Yamada et al. |
| 2004/0204848 A1 | 10/2004 | Matsuo et al. |

FOREIGN PATENT DOCUMENTS

| | | | |
|---|---|---|---|
| EP | 1 302 749 A2 | | 4/2003 |
| EP | 1 371 950 A2 | | 12/2003 |
| EP | 1371950 A2 | * | 12/2003 |
| JP | 11-051671 A | | 2/1999 |
| JP | 2001-141501 A | | 5/2001 |
| JP | 2001-148092 A | | 5/2001 |
| JP | 2001-255160 A | | 9/2001 |
| JP | 2002-221425 A | | 8/2002 |
| JP | 2002-310716 A | | 10/2002 |
| JP | 2003-139552 A | | 5/2003 |

* cited by examiner

| ADDRESS | airnavi@pioneer.co.jp | ⎫ NAVIGATION OBJECT INFORMATION |
|---|---|---|
| TITLE | DESTINATION | ⎬ INSTRUCTION INFORMATION |
| MAIN COLUMN | POSITION INFORMATION (LATITUDE/LONGITUDE) | ⎬ DESTINATION INFORMATION |
| SENDER | airnaviusr@pioneer.co.jp | ⎬ SENDER INFORMATION |

(a)

| ADDRESS | airnavi@pioneer.co.jp | ⎬ NAVIGATION OBJECT INFORMATION |
|---|---|---|
| TITLE | "DESTINATION 5/2 AM10:00"+ "ON ROUTE SITE" | ⎬ INSTRUCTION INFORMATION |
| MAIN COLUMN | POSITION INFORMATION (LATITUDE/LONGITUDE) | ⎬ DESTINATION INFORMATION |
|  | ON ROUTE SITE POSITION INFORMATION (LATITUDE/LONGITUDE) | ⎬ ON ROUTE SITE INFORMATION |
| SENDER | airnaviusr@pioneer.co.jp | ⎬ SENDER INFORMATION |

| TITLE PERMISSION CHARACTER STRING | DESTINATION, ON ROUTE SITE, ETC. |
|---|---|
| SENDER PERMISSION ADDRESS | airnaviusr@pioneer.co.jp usr2003@pioneer.co.jp |
| MAIN COLUMN PERMISSION CHARACTER STRING | POSITION INFORMATION, PASSWORD, ETC. |
| SEARCH PERFORMANCE INFORMATION | PERFORM or NOT PERFORM |
| OTHER | ADDITIONAL CONDITION, ETC. |

FIG. 9

NAVIGATION SYSTEM AND METHOD, AND COMPUTER PROGRAM PRODUCT

This is a continuation of application Ser. No. 10/895,105 filed Jul. 21, 2004 now U.S. Pat. No. 7,518,533. The entire disclosure of the prior application, application Ser. No. 10/895,105 is hereby incorporated by reference.

BACKGROUND OF THE INVENTION

1. Field of the Invention

The present invention relates to a navigation apparatus and method such as an on-vehicle navigation apparatus, and relates to a computer program product for the navigation. More particularly, it relates to a navigation and apparatus for and method of performing a route search by means of a mail feature or function on the navigation, and relates to a computer program product for performing the navigation processings.

2. Description of the Related Art

Nowadays, a navigation apparatus, especially an on-vehicle navigation apparatus, is widely spread and still in progress from day to day. The navigation apparatus displays a current position of a navigation object such as a vehicle on one's own, on a display device such as a display, on the basis of map data stored in a CD-ROM or a DVD-ROM, and provides various features or functions such as a route guidance, a route search and so on. In order to obtain the current position of the object, typically, either or both of a self-contained system and a GPS (Global Positioning System) system is/are used. The self-contained system determines or measures the current position of the object, only on the basis of information from sensors disposed at the navigation object, for sensing various parameters such as velocity, azimuth (direction) and so on. On the other hand, the GPS system determine or measures the current position by receiving measurement data transmitted from a plurality of satellites.

On the other hand, in the route search for example, a route search feature as a usual feature is typically achieved on the basis of position information that the navigation apparatus possesses. As a further improvement, a navigation apparatus is developed in which the position information is read as text information from a map image and then the route search is performed on the basis of the text information, or in which the route search is performed on the basis of a predetermined character string data on Internet (refer to Japanese Patent Application Laid-Open Nos. 2001-255160 and 2001-141501, for example).

SUMMARY OF THE INVENTION

The aforementioned navigation apparatus, however, involves the route search on the movable body such as a vehicle or the like. That is, it is required for a user to show himself/herself in front of the navigation apparatus and operate actually the navigation apparatus, in order to obtain the benefit of the navigation apparatus having the aforementioned features. Otherwise, even in the case that the route search is performed at a route search server in a so-called communication navigation system, there is another technical problem of failing in the route search, unless information necessary for the route search (e.g. information indicating a destination or an "on route site") is transmitted from the navigation apparatus itself.

Particularly, various operations for the route search on/from the navigation apparatus itself may be performed during an idling after the user gets into the vehicle and starts the engine. This may obstruct a "low emission challenge" or environmental control contemplated by reducing the exhaust gas. That situation is not preferable in view of the public interest. Additionally, there is a further technical problem of performing a measurement operation, a processing operation, a communication operation and so on prior to the route search, during the idling, if the departure position as the current position for the route search should be measured by the navigation apparatus.

The present invention has been accomplished in view of the aforementioned problems for example. It is therefore an object of the present invention to provide a navigation method of and apparatus for performing a route search to a desired destination, and for performing a route search at a user-desired time point. It is further an object of the present invention to provide a computer program product for making a computer function as the navigation apparatus.

The above object of the present invention is achieved by a first navigation system, the system having a navigation apparatus, a server apparatus and a route information transmittance apparatus, which are capable of transferring and receiving information in bidirectional inter-communication via a communication network, (i) the route information transmittance apparatus comprising: an input device for inputting route search information indicating an instruction relating to a route search; and a transmittance device for transmitting the inputted route search information to the server apparatus, (ii) the server apparatus comprising: a server side communication device for receiving the route search information transmitted from the route information transmittance apparatus; an authentication device for authenticating whether or not the received route search information is available for the navigation apparatus; and a search device for performing the route search on the basis of the authenticated route search information, wherein the server communication device further transmits search result information indicating a route searched by the search device to the navigation apparatus, and (iii) the navigation apparatus comprising: a terminal side communication device for receiving the search result information; and a route guidance device for performing a route guidance on the basis of the received search result information.

The above object of the present invention is achieved by a second navigation system, the system having a navigation apparatus, a server apparatus and a route information transmittance apparatus, which are capable of transferring and receiving information in bidirectional inter-communication via a communication network, (i) the route information transmittance apparatus comprising: an input device for inputting route search information indicating an instruction relating to a route search; and a transmittance device for transmitting the inputted route search information via the server apparatus to the navigation apparatus, (ii) the navigation apparatus comprising: a terminal side communication device for receiving the route search information transmitted from the route information transmittance apparatus via the server apparatus; and an authentication device for authenticating whether or not the received route search information is available for the navigation apparatus, wherein the terminal side communication device further transmits the authenticated route search information to the server apparatus, (iii) the server apparatus comprising: a server side communication device for receiving the route search information transmitted from the transmittance device and transmitting the received route search information to the navigation apparatus, and for receiving the authenticated route search information; and a search device for performing the route search on the basis of the authenticated route search information, wherein the server side communication device further transmits search result information indicating a route searched by the search device to the terminal side communication device, and (iv) the navigation apparatus further comprising: a route guidance device for performing a route guidance on the basis of the search result information transmitted to the terminal side communication device.

The above object of the present invention is achieved by a third navigation system, the system having a navigation apparatus, a server apparatus and a route information transmittance apparatus, which are capable of transferring and receiving information in bidirectional inter-communication via a communication network, (i) the route information transmittance apparatus comprising: an input device for inputting route search information indicating an instruction relating to a route search; and a transmittance device for transmitting the inputted route search information to the server apparatus, (ii) the server apparatus comprising: an authentication device for authenticating whether or not the route search information is available for the navigation apparatus; and a server side communication device for receiving the route search information and transmitting the authenticated route search information to the navigation apparatus, (iii) the navigation apparatus comprising: a terminal side communication device for receiving the authenticated route search information; a search device for performing the route search on the basis of the authenticated route search information; and a route guidance device for performing a route guidance on the basis of search result information indicating a route searched by the search device.

The above object of the present invention is achieved by a fourth navigation system, the system having a navigation apparatus, a server apparatus and a route information transmittance apparatus, which are capable of transferring and receiving information in bidirectional inter-communication via a communication network, (i) the route information transmittance apparatus comprising: an input device for inputting route search information indicating an instruction relating to a route search; and a transmittance device for transmitting the inputted route search information to the navigation apparatus via the server apparatus, (ii) the server apparatus comprising: a server side communication device for receiving the route search information and transmitting the received route search information to the navigation apparatus, (iii) the navigation apparatus comprising: a terminal side communication device for receiving the route search information transmitted from the route information transmittance apparatus via the server apparatus; an authentication device for authenticating whether or not the received route search information is available for the navigation apparatus; a search device for performing the route search on the basis of the authenticated route search information; and a route guidance device for performing a route guidance on the basis of search result information indicating a route searched by the search device.

The above object of the present invention is achieved by a navigation method, in a navigation system having a navigation apparatus, a server apparatus and a route information transmittance apparatus, which are capable of transferring and receiving information in bidirectional inter-communication via a communication network, (i) at the route information transmittance apparatus, the method comprising: an input process of inputting route search information indicating an instruction relating to a route search; and a transmittance process of transmitting the inputted route search information to the server apparatus, (ii) at the server apparatus, the method comprising: a server side communication process of receiving the route search information transmitted from the route information transmittance apparatus; an authentication process of authenticating whether or not the received route search information is available for the navigation apparatus; and a search process of performing the route search on the basis of the authenticated route search information, wherein at the server communication process, search result information indicating a route searched at the search process is further transmitted to the navigation apparatus, and (iii) at the navigation apparatus, the method comprising: a terminal side communication process of receiving the search result information; and a route guidance process of performing a route guidance on the basis of the received search result information.

The above object of the present invention is achieved by a computer program product, in a computer-readable medium for tangibly embodying a program of instructions executable by a computer provided for a navigation system having a navigation apparatus, a server apparatus and a route information transmittance apparatus, which are capable of transferring and receiving information in bidirectional inter-communication via a communication network, (i) the route information transmittance apparatus comprising: an input device for inputting route search information indicating an instruction relating to a route search; a transmittance device for transmitting the inputted route search information to the server apparatus, (ii) the server apparatus comprising: a server side communication device for receiving the route search information transmitted from the route information transmittance apparatus; an authentication device for authenticating whether or not the received route search information is available for the navigation apparatus; and a search device for performing the route search on the basis of the authenticated route search information, wherein the server communication device further transmits search result information indicating a route searched by the search device to the navigation apparatus, and (iii) the navigation apparatus comprising: a terminal side communication device for receiving the search result information; and a route guidance device for performing a route guidance on the basis of the received search result information, wherein the program of instructions is to make the computer function as at least one of the server apparatus, the navigation apparatus and the route information transmittance apparatus.

The nature, utility, and further features of this invention will be more clearly apparent from the following detailed description with reference to preferred embodiments and examples of the invention when read in conjunction with the accompanying drawings briefly described below.

BRIEF DESCRIPTION OF THE DRAWINGS

FIG. 8 is a view conceptually illustrating a specific example of the route search information used in the first example of the navigation system according to the present invention.

FIG. 9 is a view conceptually illustrating a specific example of initial setting information used in the first example of the navigation system according to the present invention.

DETAILED DESCRIPTION OF THE PREFERRED EMBODIMENTS

Embodiments

Figure 1:
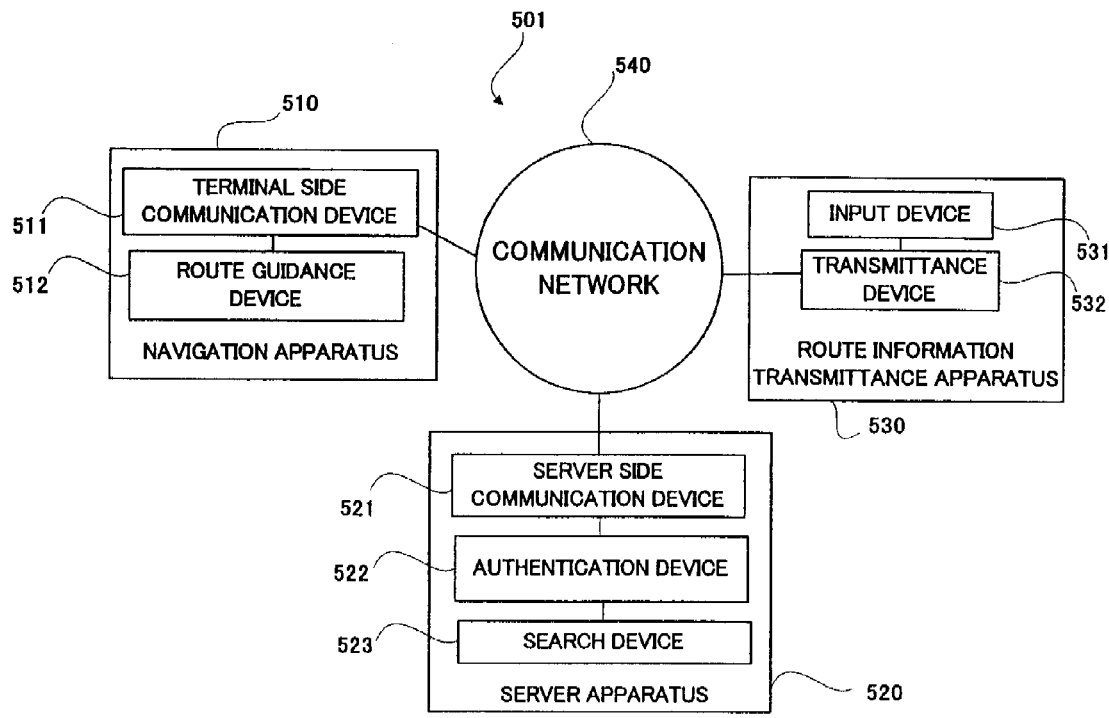
FIG. 1 is a block diagram conceptually illustrating a fundamental construction of the first embodiment of the navigation system according to the present invention.

The first embodiment of a navigation system according to the present invention (i.e. the navigation system 501), as shown in FIG. 1, is provided with: a navigation apparatus 510; a server apparatus 520; and a route information transmittance apparatus 530, which are capable of transferring and receiving information in bidirectional inter-communication via a communication network. The route information transmittance apparatus 530 is provided with: an input device 531; and a transmittance device 532. The input device 531 is for inputting route search information indicating an instruction relating to a route search. The transmittance device 532 is for transmitting the inputted route search information to the server apparatus 520. On the other hand, the server apparatus 520 is provided with: a server side communication device 521; an authentication device 522; and a search device 523. The server side communication device 521 is for receiving the route search information transmitted from the route information transmittance apparatus 530. Additionally, the server side communication device 521 is for transmitting search result information indicating a route searched by the search device 523 to the navigation apparatus 510. The authentication device 522 is for authenticating whether or not the received route search information is available for the navigation apparatus 510. The search device 523 is for performing the route search on the basis of the authenticated route search information. On the other hand, the navigation apparatus 510 is provided with: a terminal side communication device 511; and a route guidance device 512. The terminal side communication device 511 is for receiving the search result information. The route guidance device 512 is for performing a route guidance on the basis of the received search result information.

According to the first embodiment of the navigation system, during its operation, the optimal or appropriate route that may be searched by the search device 523 may be displayed on or outputted to the display or the like of the navigation apparatus 510. It is possible to perform an appropriate route guidance or route search, by displaying or outputting the route, for example, in association with map data or the like.

Particularly in the first embodiment of the navigation system, it is possible to reserve in advance a performance of the navigation processings relating to the route search, since each of the route information transmittance apparatus 530, the server apparatus 520 and the navigation apparatus 510, which are connected to each other via the communication network 540, transmits and receives information with each other.

More specifically, due to the operation of the input device 531 provided for the route information transmittance device 530, information indicating a desired route search for a user of the first embodiment of the navigation system may be inputted.

The "route search information" herein means information indicating an instruction relating to a route search. In other words, it herein means necessary information for performing the route search. More specifically, it may be a decision (or an intension) of requesting a performance of the route search, a destination for the route search, an address to which the search result (search result information) is transmitted (i.e., a mail-address or identification code of the navigation apparatus 510), requester (or sender) authentication information (i.e. a mail address or identification information of the route information transmittance apparatus 530, or a sender password indicating that the sender is an authorized person). Additionally, a departure position or a current position may be included, if known. Otherwise a "pseudo" departure position or "pseudo" current position defined by a position of the route information transmittance apparatus 530 may be included. Thus, the route search information includes various kinds of information with which the search device 523 that may be provided for the server apparatus 520 can perform the route search. Furthermore, the authentication based on the authentication information (i.e. the requester or sender authentication information as described above) included in the route search information makes it possible to prevent a mischievous or wrong transmission that may send a meaningless search result to a wrong navigation apparatus 510 irrelevant to the route search request, or to prevent a wrong charge or billing which is caused thereby. Furthermore, the route search information is sent to the server apparatus 520 via the communication network 540, due to the operation of the transmittance device 532.

The route search information transmitted from the route information transmittance apparatus 530 is received by the server apparatus 520 at the server side communication device 521, due to its operation. Then, the authentication device 522 authenticates whether or not the received route search information is available for the navigation apparatus 510 which is the object of the route search based on the route search information (or, whether or not the received route search information includes available information appropriately). If the authentication device 522 authenticates that it is available, the route search is performed on the basis of the route search information, due to the operation of the searching device 523. Then, the search device 523 generates search result information indicating a route (i.e. an optimal or an appropriate route). The search result information is transmitted to the navigation apparatus 510 to be an object of the route search based on the authenticated route search information, via the communication network 540, due to the operation of the server side communication device 521.

The search result information transmitted from the server apparatus 520 is received by the navigation apparatus 510 at the terminal side communication device 511 due to its operation. Then, for example, the route guidance device 512 performs a route guidance, on the basis of the received search result information. More specifically, a display device or an audio output device, as an example of the route guidance device 512, may display a map including a route to the destination, or outputs a simulated sound for guiding the route to the destination. Thereby, the user can check the route to the destination.

Therefore, it is possible to display the result of the route search by operating the terminal side communication device 511, the user of the first embodiment of the navigation system can move to the destination on the basis of the result of the route search for example when he/she uses a vehicle on which the navigation apparatus 510 is mounted. That is, transmitting the instruction for the route search in advance from the route information transmittance apparatus 530 prior to starting the navigation apparatus 510 or the vehicle engine makes it possible to perform the route search and to obtain the result of the route search immediately after starting the engine or the navigation apparatus 510. Thus, manipulations or operations that is conventionally involved when the driving is started (i.e. the instruction for the route search and supply the necessary information) can be eliminated, resulting in a reduction of an idling time or the like.

Additionally, for example in a logistics company, the route information transmittance apparatus 530 including a personal computer makes it possible to set or arrange in advance delivery routes for a plurality of delivery trucks. Thereby, more efficient delivery can be achieved on the basis of the preset delivery route(s). Furthermore, even if during the delivery, it is possible to respond quickly and efficiently to a sudden pickup request or the like, by receiving new search result information. Furthermore, the improved efficiency in the delivery service of the logistics company brings a great advantage of reducing in air pollutants such as exhaust gas from delivery trucks or the like.

Conclusively, according to the first embodiment of the navigation system according to the present invention, it is possible to transmit, for example in advance from the outside, the instruction for the route search, and to reserve the route search processing. Thereby, the manipulations or operations for the route search after getting into the vehicle can be eliminated. Additionally, operations-on-vehicle themselves is reduced, and thereby the idling time can be reduced, resulting in the reduction of the exhaust gas. Therefore, it brings a great advantage of achieving a "low emission challenge", a concern from the public interest in all the industries.

Incidentally, if the "destination" for the route search is set from a cell phone or the like to the server apparatus 520 via e-mail, operations or processings for the authentication or receiving search result must be performed at the navigation apparatus 510 or the server apparatus 520 during the idling of the engine, after the navigation apparatus 510 or the engine is started. Furthermore, the user must take various operations such as switch or button operations to perform these operations or processings. On the contrary, according to the first embodiment of the navigation system, as discussed above, it is possible to complete a major or almost part of the user's various operations or various processings at the server apparatus 520 or the like necessary for the route search, prior to starting the navigation apparatus 510 or the vehicle engine. That is, according to the first embodiment of the navigation system, as discussed above, the route search can be performed only by performing uncompleted processing or operations necessary for the route search, after the navigation apparatus 510 or the vehicle engine is started. For example, it may be possible to automatically display a map in which the optimal or appropriate route is indicated as the search result, when the user starts the engine or the navigation apparatus 510 for example. Thus, the first embodiment of the navigation system has a great advantage in a technological viewpoint of reducing in the idling time.

In an aspect of the first embodiment of the navigation system according to the present invention, the server side communication device 521 transmits the authenticated route search information to the navigation apparatus 510, and the terminal side communication device 511 receives the authenticated route search information.

According to this aspect, the authenticated route search information can be checked also at the navigation apparatus 510. For example, the navigation apparatus 510 may include a display device for displaying or outputting the authenticated route search information in a predetermined format and thereby prompting the user's confirmation. Alternatively, it may include an automatic confirmation device for performing such a confirmation automatically by comparing the authenticated route search information with the pre-registered information. Thereby, the user of the first embodiment of the navigation system can relatively easily check or confirm which route search information is basis for the result of the route search for example.

Figure 2:
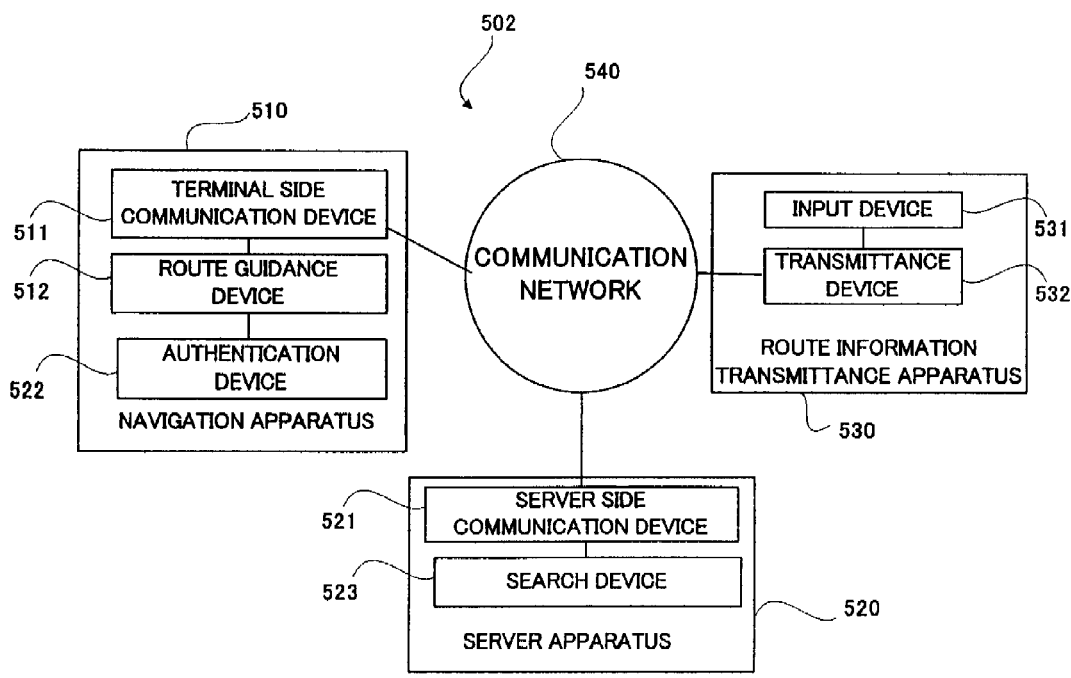
FIG. 2 is a block diagram conceptually illustrating a fundamental construction of the second embodiment of the navigation system according to the present invention.

The above object of the present invention is achieved by a second embodiment of the navigation system according to the present invention (i.e. a navigation system 502), as shown in FIG. 2, having a navigation apparatus 510, a server apparatus 520 and a route information transmittance apparatus 530, which are capable of transferring and receiving information in bidirectional inter-communication via a communication network 540. The route information transmittance apparatus 530 is provided with: an input device 531; and a transmittance device 532. The input device 531 is for inputting route search information indicating an instruction relating to a route search. The transmittance device 532 is for transmitting the inputted route search information to the server apparatus 520. In turn, the server apparatus 520 is provided with: a server side communication device 521; and a search device 523. The server side communication device 521 is for receiving the route search information transmitted from the transmittance device 532. Additionally, the server side communication device 521 is for transmitting search result information indicating a route searched by the search device 523 to the navigation apparatus 510. The search device 523 is for performing the route search on the basis of the authenticated route search information. On the other hand, the navigation apparatus 510 is provided with: a terminal side communication device 511; a route guidance device 512; and an authentication device 522. The terminal side communication device 511 is for receiving the search result information. The route guidance device 512 is for performing a route guidance on the basis of the search result information received at the terminal side communication device. The authentication device 522 is for authenticating whether or not the received route search information is available for the navigation apparatus 510.

According to the second embodiment of the navigation system, it is possible to perform the route search, similarly to the first embodiment of the navigation system.

Particularly in the second embodiment of the navigation system, it is possible to authenticate the route search information at the navigation apparatus 510. That is, the route search information transmitted from the route information transmittance apparatus 530 is transmitted to the navigation apparatus 510 that is to be an object of the route search based on the route search information. On this occasion, the route search information transmitted from the route information transmittance apparatus 530 is preferably transmitted to the navigation apparatus 510 via the server apparatus 520 capable of performing the operations like as a mail server for example. However, the route search information may be transmitted from the route information transmittance apparatus 530 directly to the navigation apparatus 510. At the navigation apparatus 510, it is authenticated whether or not the route search information is available. If the route search information is authenticated as available, it is transmitted to the server apparatus 520. At the server apparatus 520, the route search is performed on the basis of the route search information authenticated as available, and the search result information is transmitted to the navigation apparatus 510. Then, at the navigation apparatus 510, a result of the route search indicated by the search result information is displayed or outputted.

Conclusively, it is possible to obtain the benefit substantially the same as the first embodiment of the navigation system. Additionally, particularly in the second embodiment of the navigation system, the authentication processing is performed at the navigation apparatus 510, instead of the server apparatus 520 at which a delay processing (or reduction in the processing speed) may be anticipated due to the concentrated load. Thereby, the workload at the server 520 can be reduced or decentralized. Therefore, it brings a great advantage of improving the general processing performance in an entire navigation system.

In another aspect of the first or second embodiment of the navigation system according to the present invention, the navigation apparatus 510 is further provided with a measurement device. The measurement device is for measuring a current position of a movable body on which the navigation apparatus 510 is mounted. Furthermore, the terminal side communication device 511 is adapted to transmit movable body position information, indicating the measured position, to the server apparatus 520. The server side communication device 521 is adapted to receive the movable body position information. The search device 523 is adapted to perform the route search on the basis of the authenticated route search information and the received movable body position information.

According to this aspect, the appropriate route search can be achieved by obtaining in real time the current position of the movable body (e.g. a vehicle or the like) on which the navigation apparatus 510 is mounted. Therefore, the user can transmit the instruction for the route search at a desired time point, regardless of a date and time when the route information transmittance apparatus 530 transmits the instruction for the route search. Also at the navigation apparatus 510, the optimal or appropriate route to the destination, searched by the search device 523, can be displayed or outputted, regardless of the departure position of the vehicle or the like.

As discussed above, in an aspect of the navigation system provided with the measurement device, the terminal side communication device 511 is adapted to transmit the movable body position information, after the route search information is authenticated as available.

In this arrangement, if the route search information is not authenticated as available (i.e. in the case that the route search is not necessary to be performed), the movable body position information is not necessary to be transmitted. Therefore, it is possible to reduce unnecessary processing at the navigation apparatus 510, resulting in an improvement of the processing performance. Additionally, a traffic load in the communication network 540 as served in the navigation system can be reduced, and an adverse effect such as congestion can be prevented. Thereby, it brings a great advantage of achieving an efficient general operation in an entire navigation system.

Incidentally, the navigation apparatus 510 is preferably adapted to transmit the movable body position information, for example, in a case that the authenticated route search information is received, or in a case that the navigation apparatus 510 itself authenticates the route search information. Alternatively, it may be adapted to transmit the movable body position information, in a case that the navigation apparatus 510 receives an instruction of transmitting the movable body position information from the search device 523 of the server apparatus 520. However, it is possible to obtain a satisfactory benefit, even in an arrangement that information indicating a position of the navigation apparatus 510 (e.g. the aforementioned movable body position information) is transmitted, as an initial operation immediately after the navigation apparatus 510 is powered on.

In another aspect of the first or second embodiment of the navigation system according to the present invention, the route information transmittance apparatus 530 or the server apparatus 520 is further provided with a position identification device. The position identification device is for identifying a current position of the route information transmittance apparatus 530. Furthermore, the search device 523 is adapted to perform the route search, on the basis of the authenticated route search information, under an assumption in which the identified position is simulated as a current position of a movable body on which the navigation apparatus 510 is mounted.

According to this aspect, using the position identification device makes it possible to identify the departure or the current position necessary for the route search, without waiting for the measurement of the current position by the navigation apparatus 510. Thereby the search device 523 can perform the route search on the basis of the identified departure or current position. The position identification device may incorporate a GPS therein, and identify the current position on the basis of the GPS. Alternatively, the current position may be identified by a telephone number, a connection line, a relay station or the like for connecting the route information transmittance apparatus 530 and the server apparatus 520. Furthermore, the current position may be identified by address data or latitude/longitude data inputted by the user. Information indicating such a current position or departure position may be transmitted within the route search information.

For example, in the case that a personal computer or communication device at home is employed as the route information transmittance device 530, the position thereof may be simulated as a current position of a movable body such as a vehicle or the like in the garage. Therefore, information indicating the current position or the departure position of the navigation apparatus 510 can be acquired, before starting the navigation apparatus 510. Then, the route search can be performed on the basis of the information. That is, the measurement or communication during the idling can be omitted. Furthermore, it is also advantageous to perform the route search without idling, even in a case that the current position is simulated as mentioned above, with using a cell phone or a PDA or the like, on or near the vehicle, outside of the home, without starting the engine.

Incidentally, for example, if the "destination" for the route search is set from a cell phone or the like to the server apparatus 520 via e-mail, various operations or processings such as a measurement processing of the "departure" or the current position or a transmittance processing of the measurement result at the navigation apparatus 510 and the user's various operations in association with these various operations or processings are required during the idling of the engine, after the navigation apparatus 510 or the vehicle engine is started. Additionally, at the server apparatus where the movable body position information, it is acquired that the route search is performed on the basis of the movable body position information and the search result is transmitted. On the contrary, according to this aspect, the search result can be obtained or acquired from the server apparatus 520 immediately after the navigation apparatus 510 or the vehicle engine is started, without the measurement at or transmitting the result thereof from the navigation apparatus 510. It may be possible to automatically and very quickly display a map in which the optimal or appropriate route is indicated as the search result, when the user starts the navigation apparatus 510 or the engine for example.

Figure 3:
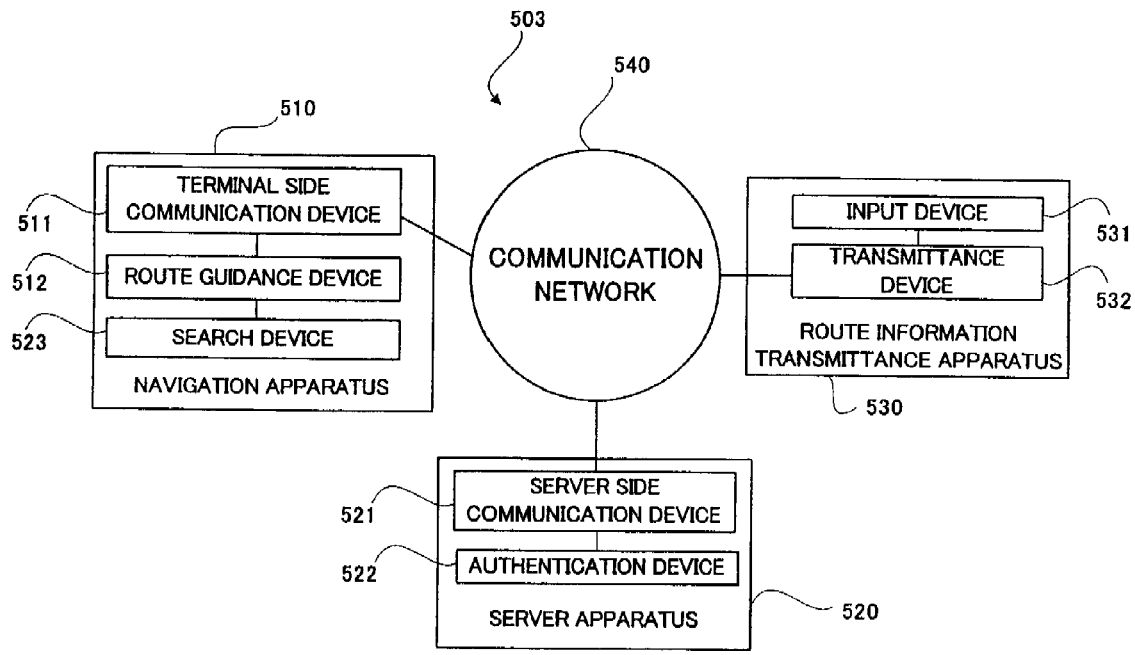
FIG. 3 is a block diagram conceptually illustrating a fundamental construction of the third embodiment of the navigation system according to the present invention.

The above object of the present invention is achieved by a third embodiment of the navigation system according to the present invention (i.e. navigation system 503), as shown in FIG. 3, having a navigation apparatus 510, a server apparatus 520 and a route information transmittance apparatus 530, which are capable of transferring and receiving information in bidirectional inter-communication via a communication network 540. The route information transmittance apparatus 530 is provided with: an input device 531; and a transmittance device 532. The input device 531 is for inputting route search information indicating an instruction relating to a route search. The transmittance device 532 is for transmitting the inputted route search information to the server apparatus 520. On the other hand, the server apparatus 520 is provided with: a server side communication device 521 and an authentication device 522. The server side communication device 521 is for receiving the route search information transmitted from the route information transmittance apparatus 530. Additionally, the server side communication device 521 is for transmitting the authenticated route search information to the navigation apparatus 510. The authentication device 522 is for authenticating whether or not the received route search information is available for the navigation apparatus 510. On the other hand, the navigation apparatus 510 is provided with: a terminal side communication device 511; a route guidance device 512; and a search device 523. The terminal side communication device 511 is for receiving the search result information. The search device 523 is for performing the route search on the basis of the authenticated route search information. The route guidance device 512 is for performing a route guidance on the basis of the search result information.

According to the third embodiment of the navigation system, it is possible to perform the route search, similarly to the first or second embodiment of the navigation system mentioned above.

Particularly in the third embodiment of the navigation system, it is possible to authenticate the route search information at the server apparatus 520 and perform the route search at the navigation apparatus 510. That is, the route search information transmitted from the route information transmittance apparatus 530 is transmitted to the server apparatus 520, and authenticated by the authentication device 522 of the server apparatus 520. If the route search information is authenticated as available, it is transmitted to the navigation apparatus 510 that is to be an object of the route search based on the route search information. Then, at the navigation apparatus 510, the route search is performed on the basis of the authenticated route search information, and the search result information indicating the result of the route search is displayed or outputted.

Conclusively, it is possible to obtain the benefit substantially the same as the first and second embodiment of the navigation systems. Additionally, particularly in the third embodiment of the navigation system, it is possible to reduce the occasion of using the communication network 540, because the route search can be performed at the navigation apparatus 510. That is, if a route change is required, the route search can be performed at the navigation apparatus 510 without using the communication network 540, and a new route can be displayed or outputted. Therefore, the cost required for the communication network 540 can be reduced, and the user can obtain the benefit of the cost.

Figure 4:
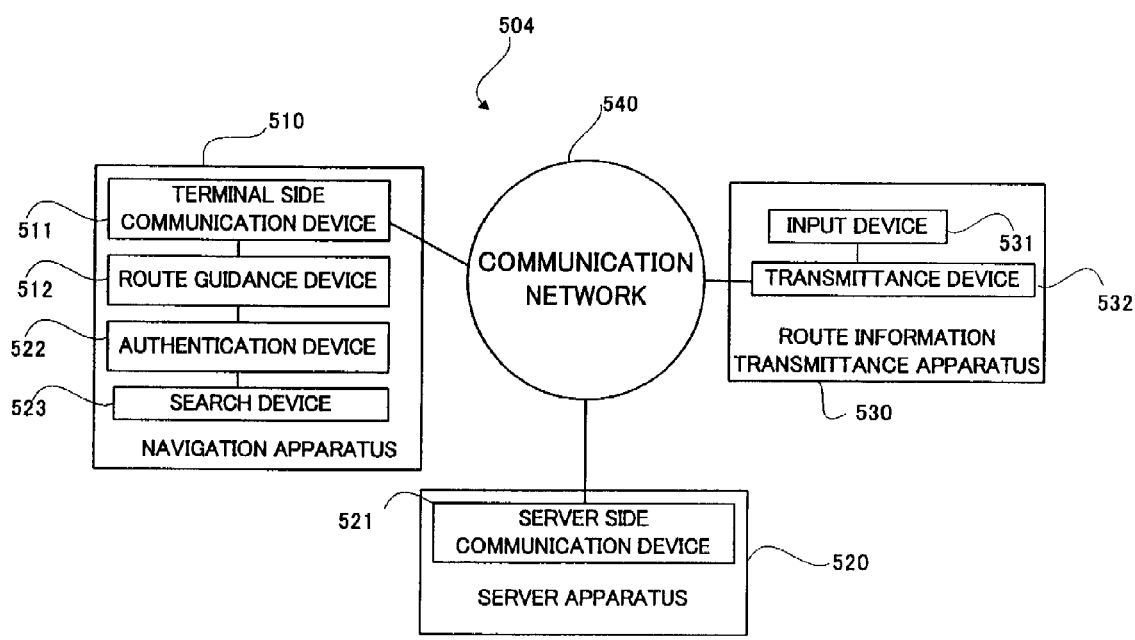
FIG. 4 is a block diagram conceptually illustrating a fundamental construction of the fourth embodiment of the navigation system according to the present invention.

The above object of the present invention is achieved by a fourth embodiment of the navigation system according to the present invention (i.e. navigation system 504), as shown in FIG. 4, having a navigation apparatus 510, a server apparatus 520 and a route information transmittance apparatus 530, which are capable of transferring and receiving information in bidirectional inter-communication via a communication network 540. The route information transmittance apparatus 530 is provided with: an input device 531; and a transmittance device 532. The input device 531 is for inputting route search information indicating an instruction relating to a route search. The transmittance device 532 is for transmitting the inputted route search information to the navigation apparatus 510. On the other hand, the server apparatus 520 is provided with a server side communication device 521. The server side communication device 521 is for receiving the route search information transmitted from the route information transmittance device 530. Additionally, the server side communication device 521 is for transmitting the route search information to the navigation apparatus 510. On the other hand, the navigation apparatus is provided with: a terminal side communication device 511; a route guidance device 512; an authentication device 522; and a search device 523. The terminal side communication device 511 is for receiving the route search information. The route guidance device 512 is for performing a route guidance on the basis of the search result information. The search device 523 is for performing the route search on the basis of the authenticated route search information. The authentication device 522 is for authenticating whether or not the received route search information is available for the navigation apparatus 510.

According to the fourth embodiment of the navigation system, it is possible to perform the route search, similarly to the first, second and third embodiment of the navigation system mentioned above.

Particularly in the fourth embodiment of the navigation system, it is possible to perform the authentication processing of the route search information and the route search processing at the navigation apparatus 510. That is, the route search information transmitted from the route information transmittance apparatus 530 is transmitted to the navigation apparatus 510 that is to be an object of the route search based on the route search information. On this occasion, the route search information transmitted from the route information transmittance apparatus 530 is preferably transmitted to the navigation apparatus 510, via the server apparatus 520 capable of performing operations like as a mail server or the like. However, the route search information may be transmitted from the route information transmittance apparatus 530 directly to the navigation apparatus 510. At the navigation apparatus 510, it is authenticated whether or not the route search information is available. If the route search information is authenticated as available, the route search is performed on the basis of the authenticated route search information, and search result information indicating the result of the route search is displayed or outputted.

Conclusively, it is possible to obtain the benefit substantially the same as the first, second and third embodiment of the navigation system. Additionally, particularly in the fourth embodiment of the navigation system, the user can transmit the route search information at a desired time point, regardless of a use of the navigation apparatus 510 (e.g. regardless whether or not it is activated), by transmitting the route search information via the server apparatus, even in an arrangement that the authentication processing and the route search processing are performed at the navigation apparatus 510. Additionally, performing the authentication processing at the navigation apparatus 510, instead of the server apparatus 520 at which a delay processing (or a reduction in the processing speed) may be anticipated due to the concentrated load, makes it possible to reduce or decentralize the load to the server apparatus. Therefore, it brings a great advantage of improving the general processing performance in an entire navigation system.

In another aspect of the third or fourth embodiment of the navigation system according to the present invention, the navigation apparatus 510 is further provided with a measurement device. The measurement device is for measuring a current position of a movable body on which the navigation apparatus 510 is mounted. Furthermore, the search device 523 is adapted to perform the route search on the basis of the authenticated route search information and movable body position information indicating the measured position.

According to this aspect, similarly to another aspect of the first or second embodiment of the navigation system mentioned above, an appropriate route search can be achieved by obtaining in real time the current position of the movable body (e.g. a vehicle or the like) on which the navigation apparatus 510 is mounted.

Additionally, if the route search information that is not authenticated as available is transmitted to the route information transmittance apparatus 530 (i.e. if the route search is not necessary to be performed), the current position is not necessary to be measured. Therefore, using the navigation apparatus 510 makes it possible to reduce the meaningless processing and improve the processing performance.

In another aspect of the third or fourth embodiment of the navigation system according to the present invention, the route information transmittance apparatus 530 or the server apparatus 520 is further provided with a position identification device. The position identification device is for identifying a current position of the route information transmittance apparatus 530. Furthermore, the server side communication device 521 is adapted to transmit apparatus position information indicating the identified position to the terminal side communication device 511. The search device 523 is adapted to perform the route search, on the basis of the authenticated route search information, under an assumption in which a position indicated by the transmitted apparatus position information is simulated as a current position of a movable body on which the navigation apparatus 510 is mounted.

According to this aspect, similarly to other aspects of the first or second embodiment of the navigation system mentioned above, using the position identification device makes it possible to identify the departure or current position necessary for the route search, without waiting for the measurement of the current position by the navigation apparatus 510. Thereby the search device 523 can perform the route search on the basis of the identified departure or current position. Incidentally, information indicating such a departure or current position (i.e. apparatus position information) may be transmitted within the route search information. Or it may be transmitted to the navigation apparatus 510 including the search device 523, by the server side communication device 521 for example.

In at least one aspect of the first, second, third and fourth embodiment of the navigation system according to the present invention, the authentication device 522 is adapted to authenticate that the route search information is available, if the route search information includes a character string recognizable by the search device 520.

According to this aspect, retrieving the character string included in the route search information makes it possible to authenticate relatively easily whether or not the route search information is available for the navigation apparatus 510. Incidentally, the "character string recognizable by the search device" herein is intended to indicate that the search processing can be performed by using the character string. That is, "character string recognizable by the search device" includes a character string indirectly allowing to perform the search processing on the basis of the modified character string that is obtained by doing a predetermined calculation or processing to the character string, even if the search processing is not performed by directly using the unmodified character string. Additionally, the "character string" is intended to include a symbol, numeral and so on indicating predetermined information, in addition to a "character" literally, for example a "character" in Japanese or English.

Alternatively, as mentioned below, if the route search information includes the sender information, for example, it is preferably authenticated as available, in the case that a character string indicated by the sender information indicates an authorized sender.

Incidentally, in this case, if the route search information includes a recognizable character string for the search processing performed by the search device 523, it may be authenticated as available, regardless of whether or not another unrecognizable character string exists. However, it may be authenticated as available, in the case that all the character strings are recognizable by the search device 523.

In at least one aspect of the first, second, third and fourth embodiment of the navigation system according to the present invention, the authentication device 522 is adapted to include a storing device. The storing device is for storing initial setting information. The authentication device 522 is adapted to authenticate whether or not the route search information is available, with reference to the initial setting information and the route search information.

According to this aspect, it is possible to refer to initial setting information that is stored in the storing device including an information record medium such as a hard disk or the like. For example, if the route search information (or character strings), which is/are able to be authenticated, is/are stored as the initial setting information, the authentication device 522 can authenticate relatively easily whether or not the route search information is available, with reference to these information. For example, as mentioned below, if the route search information includes sender information, sender information, which is able to be authenticated, may be stored in the storing device as the initial setting information. Alternatively, predetermined information further necessary for authenticating the route search information may be stored in the storing device as the initial setting information.

In at least one aspect of the first, second, third and fourth embodiment of the navigation system according to the present invention, the route search information includes sender information indicating a sender who transmits the route search information.

According to this aspect, the authentication device 522 can authenticate relatively easily whether or not the route search information is available, with reference to the sender information included in the route search information. That is, for example, the route search information including sender information indicating an authorized user (or permitted user) is authenticated as available, while other route search information is not authenticated as available. Therefore, it is possible to prevent the route search based on the route search information transmitted from an unauthorized sender from being performed.

In at least one aspect of the first, second, third and fourth embodiment of the navigation system according to the present invention, the route search information includes search object information designating the navigation apparatus 510 for which the route search is performed on the basis of the route search information.

According to this aspect, it is possible to designate appropriately the navigation apparatus 510 for which the route search is to be performed on the basis of the route search information.

In at least one aspect of the first, second, third and fourth embodiment of the navigation system according to the present invention, the route search information includes destination information indicating at least one of name and position of a destination for the route search.

According to this aspect, it is possible to transmit appropriately the instruction, for searching a route to a desired destination. The "destination information" herein may include a character string to indicate that the route search information includes the destination information, or may include latitude and longitude from which the destination position is indicated, or a character string (or symbol, numeral and so on) from which a position (i.e. destination) is identified.

In at least one aspect of the first, second, third and fourth embodiment of the navigation system according to the present invention, the route search information includes "on route site" information indicating at least one of name and position of an "on route site".

According to this aspect, it is possible to designate an "on route site" on the way to the destination. Similarly to the destination information mentioned above, the "on route site" information may include a character string to indicate that the route search information includes the "on route site" information, or may include a character string from which a "on route site" is identified.

In at least one aspect of the first, second, third and fourth embodiment of the navigation system according to the present invention, the route search information includes date information indicating at least one of date and time point when the search device 523 performs the route search on the basis of the route search information.

According to this aspect, the route search can be performed at/on a desired date and time indicated by the date information, regardless of a date and time when the route information transmittance apparatus 530 transmits the route search information. That is, the user can transmit in advance the route search information, regardless of the date and time when the route search is actually to be performed.

In at least one aspect of the first, second, third and fourth embodiment of the navigation system according to the present invention, the navigation apparatus 510 is further provided with a display confirmation device. The display confirmation device is for confirming whether or not a result of the result of the route search is to be displayed and/or outputted.

According to this aspect, the user or the like can select intentionally a desired result of the route search to be displayed and/or outputted. Therefore, it is possible to prevent the result of the route search from being displayed and/or outputted despite the user's intention, and prevent the user from being confused.

The above object of the present invention is achieved by an embodiment of the navigation method according to the present invention in a navigation system having a navigation apparatus 510, a server apparatus 520 and a route information transmittance apparatus 530, which are capable of transferring and receiving information in bidirectional inter-communication via a communication network 540. At the route information transmittance apparatus 530, the method is provided with: an input process; and a transmittance process. At the input process, inputting route search information indicating an instruction relating to a route search is performed. At the transmittance process, transmitting the inputted route search information to the server apparatus is performed. At the server apparatus, the method is provided with: a server side communication process; an authentication process; and a search process. At the server side communication process, receiving the route search information transmitted at the route information transmittance process is performed. At the authentication process, authenticating whether or not the received route search information is available for the navigation apparatus 510 is performed. At the search process, performing the route search on the basis of the authenticated route search information is performed. At the server communication process, search result information indicating a route searched by the search device 523 is further transmitted to the navigation apparatus 510. At the navigation apparatus 510, the method is provided with: a terminal side communication process; and a route guidance process. At the terminal side communication process, receiving the search result information is performed. At the route guidance process, performing a route guidance on the basis of the received search result information is performed.

According to the embodiment of the navigation method according to the present invention, similarly to the first embodiment of the navigation system mentioned above, the route search information inputted at the input process is transmitted to the server apparatus at the transmittance process. At the server apparatus, it is authenticated, at the authentication process, whether or not the route search information is available. At the search process, the route search is performed on the basis of the authenticated route search information. Then, at the server side communication process, the search result information is transmitted to the navigation apparatus 510. Then, at the navigation apparatus 510, the search result information is received at the terminal side communication process, and the route (i.e. an optimal or an appropriate route) is displayed and/or outputted on a display or the like at the route guidance process.

Therefore, it is possible to transmit from the outside the instruction for the route search in advance. Thereby, the manipulations or operations for the route search after getting onto the vehicle can be eliminated. Additionally, operations-on-vehicle themselves is reduced, and thereby the idling time can be reduced, resulting in the reduction of the exhaust gas. Therefore, it brings a great advantage of achieving a "low emission challenge", a concern from the public interest in all the industries.

Incidentally, the embodiment of the navigation method according to the present invention may take various aspects, corresponding to various aspects of the first embodiment of the navigation system according to the present invention mentioned above.

Additionally, the navigation method corresponding to at least one of the second, third and fourth embodiment of the navigation system according to the present invention can take the same benefit. That is, the search process may be performed at the server apparatus, and the authentication process may be performed at the navigation apparatus 510. Or the authentication process may be at the server apparatus, and the search process may be performed at the navigation apparatus 510. Alternatively, both the authentication process and the search process may be performed a the navigation apparatus 510.

The above object of the present invention is achieved by an embodiment of the computer program product according to the present invention in a computer-readable medium for tangibly embodying a program of instructions executable by a computer provided for at least one of the first, second, third and fourth embodiment of the navigation system according to the present invention having a navigation apparatus, a server apparatus and a route information transmittance apparatus, which are capable of transferring and receiving information in bidirectional inter-communication via a communication network. The program of instructions is to make the computer function as at least one of the server apparatus, the navigation apparatus and the route information transmittance apparatus.

According to the embodiment of the computer program product according to the invention, at least one of the first, second, third and fourth embodiment of the navigation system according to the present invention can be realized relatively easily, by reading and running the computer program product from a record medium, such as a ROM, a CD-ROM, a DVD-ROM, a hard disk and so on, in/on which the computer program is stored, or by downloading the computer program product to the computer via the communication device and running it.

The embodiment of the computer program product for the navigation system according to the present invention can take various aspects, corresponding to various aspects of at least one of the first, second, third and fourth embodiment of the navigation system according to the present invention mentioned above.

As discussed above, according to the first embodiment of the navigation system of the invention, (i) the route information transmittance apparatus 530 including the input device 531 and the transmittance device 532, (ii) the server apparatus including the authentication device 522, the search device 523 and the server side communication device 521, and (iii) the navigation apparatus 510 including the terminal side communication device 511 and the route guidance device 512 are connected via the communication network 540. On the other hand, according to the second embodiment of the navigation system of the invention, (i) the route information transmittance apparatus 530 including the input device 531 and the transmittance device 532, (ii) the server apparatus including the search device 523 and the server side communication device 521, and (iii) the navigation apparatus 510 including the authentication device 522, the terminal side communication device 511 and the route guidance device 512 are connected via the communication network 540. On the other hand, according to the third embodiment of the navigation system of the invention, (i) the route information transmittance apparatus 530 including the input device 531 and the transmittance device 532, (ii) the server apparatus 520 including the authentication device 522 and the server side communication device 521, and (iii) the navigation apparatus 510 including the search device 523, the terminal side communication device 511 and the route guidance device 512 are connected via the communication network 540. On the other hand, according to the fourth embodiment of the navigation system of the invention, (i) the route information transmittance apparatus 530 including the input device 531 and the transmittance device 532, (ii) the server apparatus including the server side communication device 521, and (iii) the navigation apparatus 510 including the authentication device 522, the search device 523, the terminal side communication device 511 and the route guidance device 512 are connected via the communication network. On the other hand, according to the embodiment of the navigation method of the invention, the input process and the transmittance process are performed at the route information transmittance apparatus 530, the authentication process, the search process and the server side communication process are performed at the server apparatus, and the terminal side communication process and the route guidance process are performed at the navigation apparatus 510.

Thereby, it is possible to transmit the instruction for the route search in advance from the outside. Thereby, the manipulations or operations for the route search after getting onto the vehicle can be eliminated. Additionally, operations-on-vehicle themselves is reduced, and thereby the idling time can be reduced, resulting in the reduction of the exhaust gas. Therefore, it brings a great advantage of achieving a "low emission challenge", a concern from the public interest in all the industries.

EXAMPLES

Now, examples of the present invention will be discussed, with reference to drawings.

First Example

With reference to FIG. 5 to FIG. 11, the first example of the navigation system according to the present invention will be discussed. The first example employs a construction in which an authentication and a route search are performed at a server, as mentioned later.

(Fundamental Construction of Navigation System)

Figure 5:
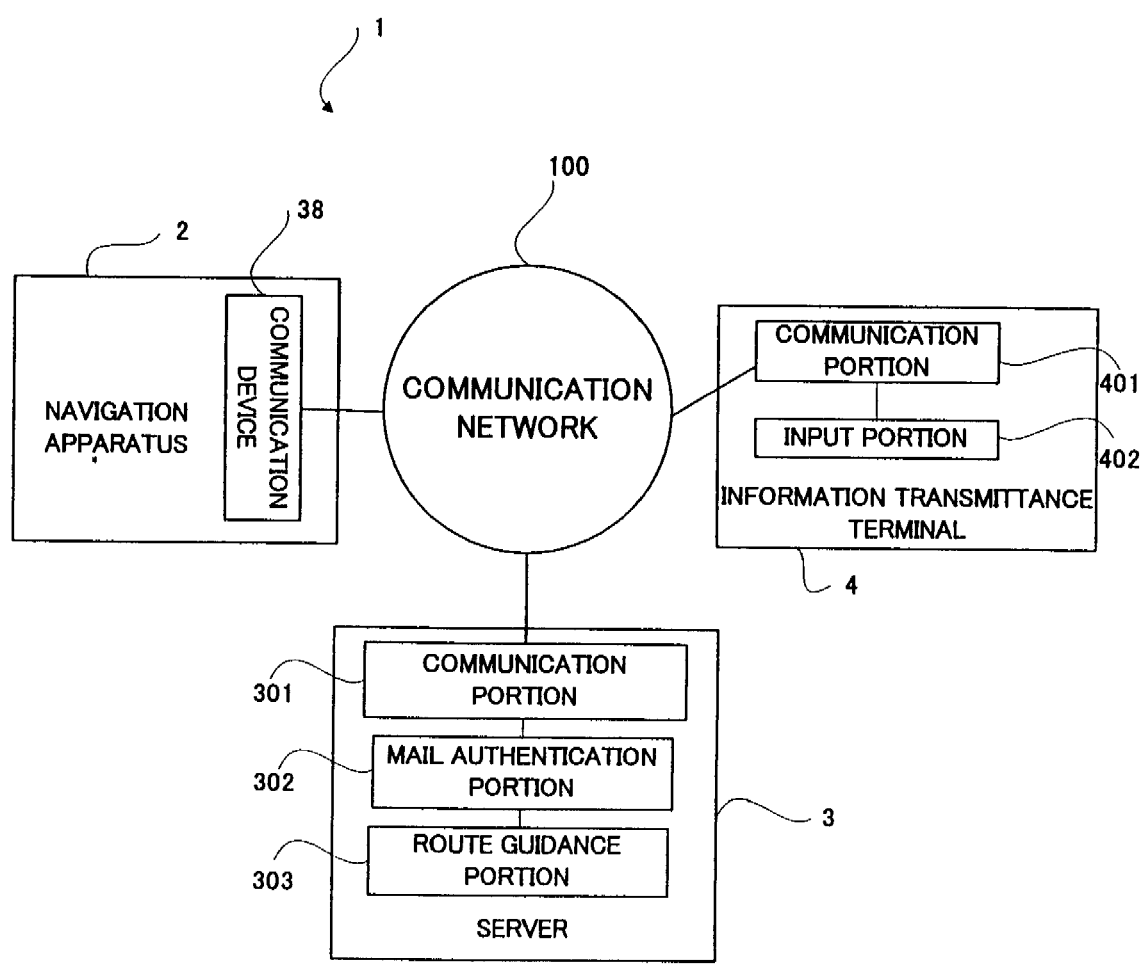
FIG. 5 is a block diagram illustrating a fundamental construction of the first example of the navigation system according to the present invention.
Figure 6:
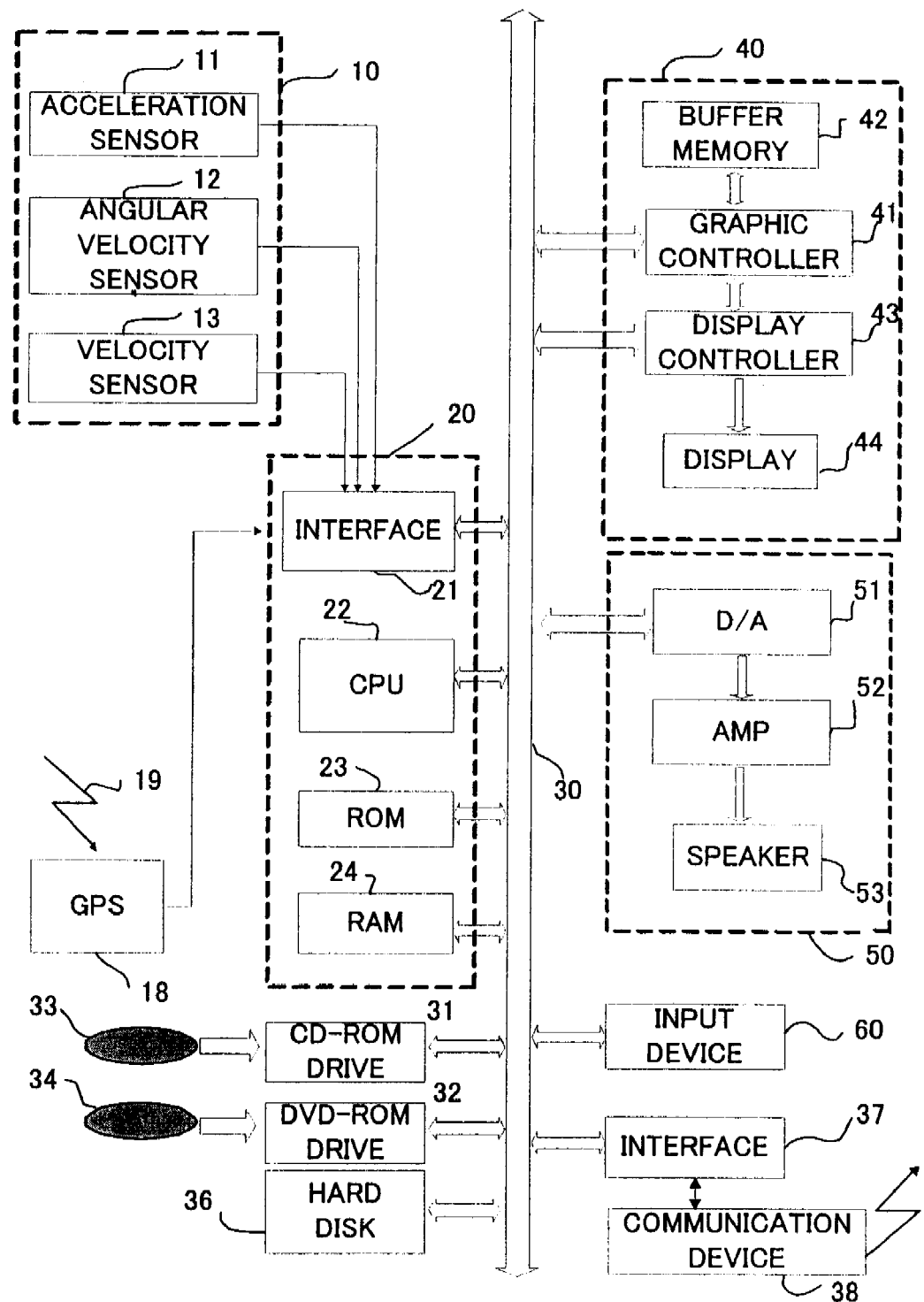
FIG. 6 is a block diagram illustrating a fundamental construction of a navigation apparatus in the first example of the navigation system according to the present invention.

Firstly, with reference to FIG. 5 and FIG. 6, the fundamental construction of the first example of the navigation system according to the present invention will be discussed. FIG. 5 is a block diagram illustrating an entire construction of the first example of the navigation system according to the present invention. FIG. 6 is a block diagram illustrating a construction of a navigation apparatus provided with the first example of the navigation system according to the present invention.

As shown in FIG. 5, the navigation system 1 is provided with: a navigation apparatus 2; a server 3; and an information transmission terminal 4.

The navigation apparatus 2 is an apparatus to be mounted on a mobile body such as a vehicle or automobile, and capable of performing a predetermined kind of route search, such as an optimal route indication on a map, on the basis of a result of the route search performed at the server 3. Incidentally, a detail construction thereof will be discussed later (See FIG. 6).

The server 3 may be provided with: a large or medium sized computer; a workstation; a personal computer and so on. More specifically, it is provided with: a communication portion 301; a mail authentication portion 302; and a route search portion 303. The server 3 receives an e-mail including route search information therein (i.e. a mail with destination information) transmitted from the information transmittance terminal 4, and verifies contents of the received e-mail. Thereby, the server 3 can perform a route search, if needed. The route search information herein means information indicating an instruction in the route search generated and transmitted by a user of the navigation system 1.

The communication portion 301 includes a transceiver (e.g. a modem, a DSU, a router, an antenna or a radio transceiver) capable of transmitting and receiving information via a wired or unwired communication line (i.e. such as a communication network 100). For example, the communication portion 301 performs a data transfer to the navigation apparatus 2 and the information transmittance terminal 4, for transmitting and receiving required or necessary information. Alternatively, the communication portion 301 may be arranged to transfer the required or necessary information with another data server or the like.

The mail authentication portion 302 is arranged to judge or authenticate whether or not the route search information in the e-mail transmitted from the information transmittance terminal 4 for example is transmitted from an authorized sender, otherwise whether or not such route search information is available or useful for a route search. Additionally, the mail authentication portion 302 may include an information record medium such as a hard disk or the like, for storing initial setting information used for the mail authentication as mentioned later.

The route search portion 302 is arranged to search the optimal or appropriate route to a destination for example, on the basis of the route search information in the e-mail transmitted from the information transmittance terminal 4.

Incidentally, at least one of the aforementioned mail authentication portion 302 and the route search portion 303 may be embodied in a form of program that is performed on a CPU (not shown) of the server 3, or may be embodied in a form of hardware such as an IC chip or the like.

The information transmittance terminal 4 may include a cell phone, a personal computer, a PDA (Personal Digital Assistance) and so on. More specifically, it includes a communication portion 401 and an input portion 402.

The communication portion 401 is arranged to transmit the route search information generated at the input portion 402 to the server 3 or the navigation apparatus 2, via the communication network 100. For example, the route search information is preferably transmitted via e-mail.

The input portion 402, which may include an operational button, a keyboard and so on, is arranged to generate the route search information by the user.

The communication network 100 may be of wired or unwired, or may be of wired in part and unwired in another part. Furthermore, it may be a private line, or may be a public line or telephone line, or may be a packet network, or may be a circuit-switched network. Alternatively, Internet may be employed as the communication network 100.

Any other form of communication network can be employed as the communication network 100 according to the present invention, insofar as transferring (transmitting and receiving) data among the navigation apparatus 2, the server 3 and the information transmittance terminal 4 is performed via the communication network.

Next, with reference to FIG. 6, a detail construction of the navigation apparatus 2 will be discussed.

As shown in FIG. 6, the navigation apparatus 2 is provided with: a sensor portion 10; a GPS receive portion 18; a control portion 20; a data bus 30; a CD-ROM drive 31; a DVD-ROM drive 32; a hard disk 36; a video output portion 40; an audio output portion 50; an input device 60; and a communication device 38.

The sensor portion 10, which is for sensing information about a movement of a navigation object (i.e. for example mobile body such as a vehicle or automobile) itself, is provided with: an acceleration sensor 11; an angular velocity sensor 12; and a velocity sensor 13. The acceleration sensor 11 is for sensing an acceleration of the navigation object, and is capable of further calculating a velocity from the sensed acceleration. The angular velocity sensor 12 is for sensing an angular velocity of the navigation object. The velocity sensor 13 is for sensing a velocity of the navigation object.

The GPS receive portion 18 is capable of identifying a current position of the navigation object, by receiving information in radio wave 19 from GPS satellites, for example by means of a receiver or the like.

The control portion 20, which is for controlling entirely the navigation apparatus 2, is provided with: an interface 21; a CPU 22; a ROM 23 and a RAM 24. The interface 21 transfers data with the sensor portion 10 and the GPS receive portion 18, and outputs the received data to the CPU 22 or the like. The CPU 22 identifies the current position of the navigation object, on the basis of the data inputted via the interface 21. The CPU 22 performs a computation or arithmetic processing for controlling entirely the navigation apparatus 2. Particularly in this first example, the CPU 22 controls the CD-ROM drive 31, the DVD-ROM drive 32 or the hard disk 36, and reads map data from a CD-ROM 33, a DVD-ROM 34 or the hard disk 36, otherwise receives the map data at the communication device 38 via the communication network 100. Then, it performs a navigation processing, on the basis of the received map data. The ROM 23, in which a microprogram or the like is recorded, defines an operation of the control portion 20. The RAM 24, which may include a volatile semiconductor memory such as a DRAM, a SDRAM or the like, is used as a record medium on/in which data is recorded during the operation of the CPU 22.

The data bus 30 is used for transferring data respectively among the control portion 20, the CD-ROM drive 31, the DVD-ROM drive 32, the hard disk 36, the video output portion 40, the audio output portion 50, the input device 60, and the interface 37.

The CD-ROM drive 31 or the DVD-ROM drive 32 is a device for reading the CD-ROM 33 or the DVD-ROM 34, on/in which original data including the map data is stored.

The hard disk 36 can replace the aforementioned CD-ROM 33 or DVD-ROM 34, for storing the map data, or for reading the map data, if needed, under control of the CPU 22.

The video output portion 40 displays a road condition or a route guidance, in response to the navigation processing, under control of the control portion 20, or displays a screen for inputting an instruction from the outside via the input device 60. The video output portion 40 is provided with: a graphic controller 41; a buffer memory 42; a display control portion 43; and a display 44, The graphic controller 41, which may include a microcomputer or the like, is for controlling entirely the display processing. The buffer memory 42, which may include a semiconductor memory such as a DRAM or the like, stores video data to be displayed, and inputs/outputs the video data, in accordance with an input/output instruction of the graphic controller 41. The display control portion 43 controls the display 44 and performs the display processing, under control of the graphic controller 41. The display 44, which may include an LCD (Liquid Crystal Display) device, a CRT (Cathode Ray Tube) display or the like, actually displays the video data.

The audio output portion 50, which is provided with: a digital-analog converter 51; an amplifier 52; and a speaker 53, outputs sound, in response to the navigation processing, under control of the control portion 20. The digital-analog converter 51 converts a digital audio signal outputted within the navigation apparatus 2 into an analog audio signal. The amplifier 52 amplifies the converted analog audio signal and controls the output level. The speaker 53 converts the amplified analog audio signal outputted from the amplifier 52 into sound, and outputs the sound.

The input device 60, which may include a remote controller, a controller, a touch panel and so on, receives an external instruction to the navigation apparatus 2.

The interface 37 controls an input/output between each component of the navigation apparatus 2 and data that may be transferred by the communication device 38 with the server 3 or the like.

The communication device 38, which is provided with a transceiver or the like (e.g. a modem, a DSU, a router, an antenna, or a radio wave transceiver and so on) capable of transmitting and receiving information via a wired or unwired communication line (i.e. such as the communication network 100), transmits and receives necessary information, for example by performing a data transfer to the server 3. Alternatively, the communication device 38 may be arranged to transfer the necessary data with the information transmittance terminal 4, any other data server and so on.

(Operational Principle of First Embodiment)

Figure 7:
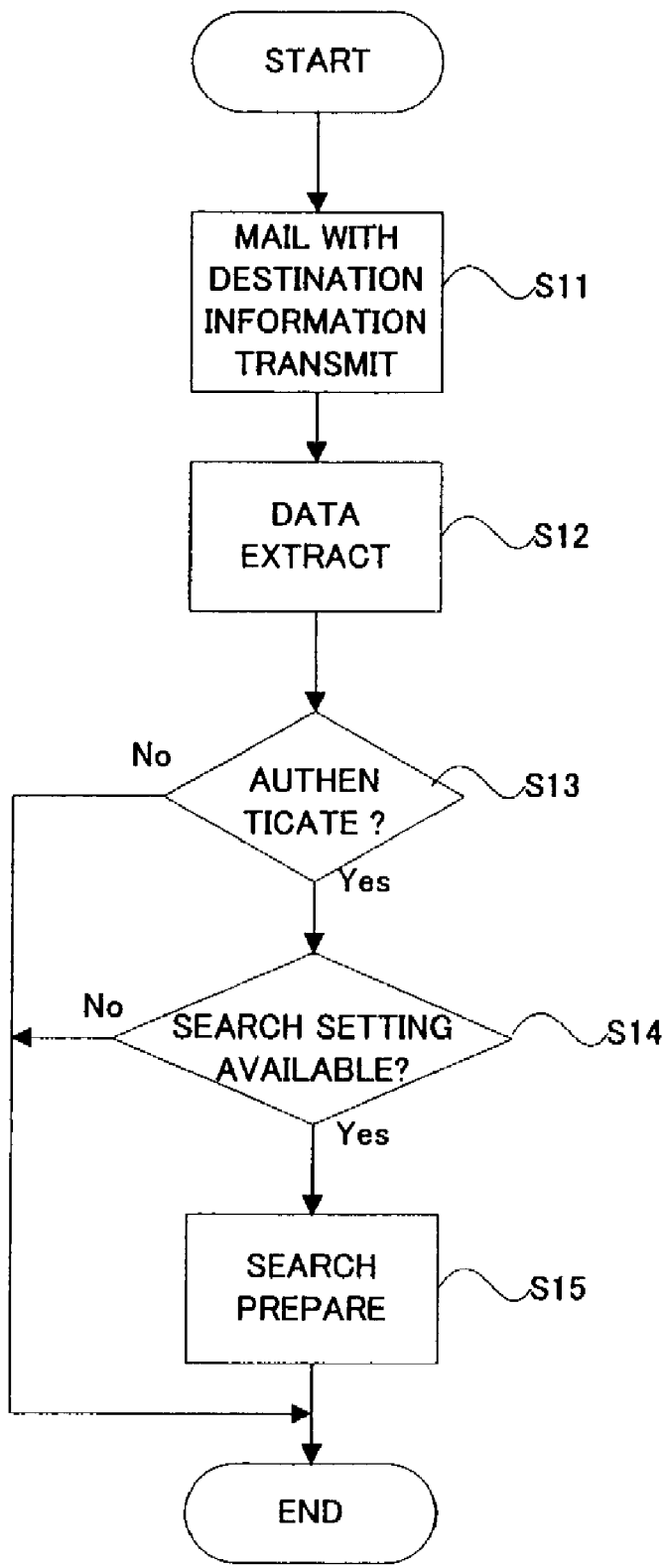
FIG. 7 is a flow chart illustrating an exemplary operational flow until an authentication processing of the route search information, in the first example of the navigation system according to the present invention.
Figure 10:
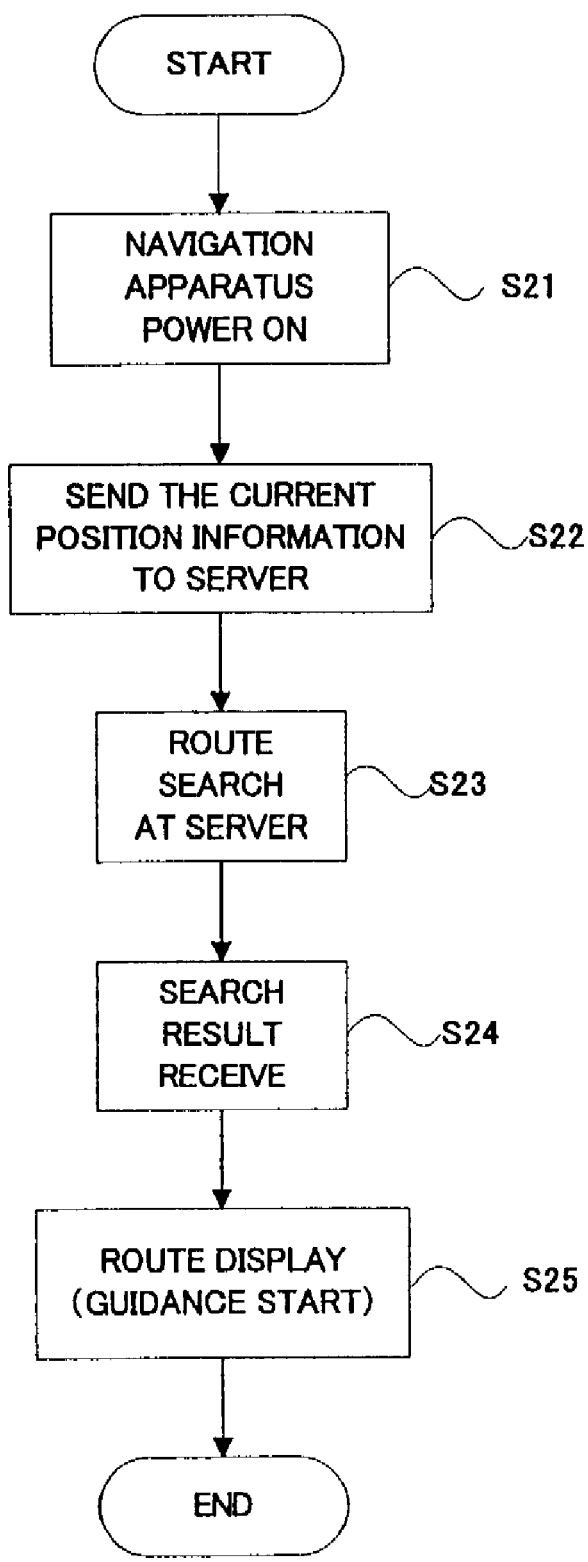
FIG. 10 is a flow chart illustrating an operational flow from the route search to the result output display in the first example of the navigation system according to the present invention.

Next, with reference to FIG. 7 to FIG. 10, an operation of the navigation apparatus in this first example according to the present invention will be discussed, on the basis of specific examples. FIG. 7 is a flow chart illustrating an authentication of route search information. FIG. 8 is a view conceptually illustrating contents of the route search information. FIG. 9 is a view conceptually illustrating contents of initial setting information used for the authentication of the route search information. FIG. 10 is a flow chart illustrating an operational flow from the route search to the result output display.

As shown in FIG. 7, from the communication portion 401 of the information transmittance terminal 4, a mail with destination information (i.e. route search information) is transmitted as an e-mail (step S11). A address of the mail is set to be the navigation apparatus 2. The mail is preferably received at the server 3. That is, the server 3 preferably has a feature like as a mail server.

Then, the route search information is received at the communication portion 301 of the server 3. Then, the route search information is analyzed at the mail authentication portion 302, and the data (i.e. a character string, numeral, symbol and the like indicating predetermined information) is extracted (step S12). Then, on the basis of the extracted information, it is judged whether or not the extracted information is able to be authenticated (step S13). The authentication is judged whether or not the route search information is transmitted from an authorized sender, with reference to the extracted character string for example.

The route search information may include contents of data as shown in FIG. 8 (*a*) and FIG. 8(*b*) for example. That is, as shown in FIG. 8 (*a*), the route search information includes (i) navigation object information for indicating an address, (ii) instruction information for indicating instruction contents indicated by the route search information, (iii) destination information for identifying specifically a destination position of the route search and (iv) sender information for identifying a sender who transmitted the route search information.

The navigation object information may be preferably the e-mail address of the navigation apparatus 2, for example which may be an object of the route search. The mail authentication portion 302 judges that the route search is available (i.e. search setting is available) by authenticating that the route search information covers the navigation apparatus 2 of a specific user as the object of the route search. On the other hand, the communication portion 301 may transmit the route search information or search result information indicating the result of the route search to the navigation apparatus 2, on the basis of the route search information for example.

The instruction information may include a character string "destination", and may be indicated in a title column of an e-mail. The mail authentication portion 302 may authenticate the character string "destination", and judge that the route search is available because the route search information indicates the destination. Then, the route search portion 303 may search the optimal or appropriate route to the destination of the route search indicated by the character string "destination" for example.

The destination information may be indicated in a main column of an e-mail, and may include latitude and longitude information capable of identifying a destination position for example, a map code for indicating a position of the destination on the predetermined map data, or a geographic name for identifying the destination, and so on. The mail authentication portion 302 may authenticate that the destination information identifies appropriately the destination position, and thereby may judge that the route search is available. Then, the route search portion 303 may search the optimal or appropriate route, on the basis of the destination information for example.

The sender information may include the e-mail address of the sender for example. The mail authentication portion 302 may authenticate that the sender information identifies the authorized sender, and thereby may judge that the route search information is be able to be authenticated.

Alternatively, as shown in FIG. 8 (*b*), the route search information may include date information for indicating a date when the route search is to be performed, and "on route site" information for indicating an "on route site" position on the way to the destination, in a title column of the e-mail.

The date information may be coupled with and incorporated into the instruction information. For example, the date information shown in FIG. 8 (*b*) indicates an instruction to perform a route search based on this route search information at 10:00 AM, on May 2. The mail authentication portion 302 may authenticate that the date information is capable of identifying a predetermined date, and thereby may judge that the route search is available. Then, the route search portion 303 may perform the route search on the date indicated by the date information for example.

The "on route site" information may be described after the destination information in the main column of an e-mail, and may include latitude and longitude information capable of identifying an "on route site" position, a map code for indicating a position of the "on route site" on the predetermined map data, or a geographical name for identifying the "on route site" position, and so on. Incidentally, if the e-mail includes the "on route site" information, the existence of the "on route site" information may be indicated by the instruction information. The mail authentication portion 301 may authenticate that the "on route site" information identifies appropriately the "on route site" position, and thereby may judge that the route search is available. Then, the route search portion 303 may search the optimal or appropriate route, on the basis of the "on route site" information for example. Incidentally, it is possible to indicate the "destination" by adding it to the "on route site" information indicated in the main column, instead of indicating the "destination" in the title column.

Alternatively, the "on route site" information may be transmitted to the server 3 via e-mail independent of the route search information including therein the destination information for example, instead of being transmitted with the destination information as shown in FIG. 8 (*b*).

Furthermore, in the case that the navigation system 1 is constructed to request a password, the password may be indicated in the main column, otherwise information for indicating a departure position for example may be included as discussed later.

Then, if the route search information as shown in FIG. 8 (*a*) and FIG. 8 (*b*) is transmitted via e-mail for example, the navigation object information and the sender information are included in the e-mail (i.e. the route search information) as a function or a format of the e-mail. Then, the destination information and the instruction information may be preferably inputted into the main column and the title column of the e-mail, respectively, in accordance with a predetermined character string, symbol, code or the like, via the input device 402 for example. Thereby, it is possible to generate relatively easily and transmit an e-mail including therein route search information necessary for a route search.

Incidentally, when the mail authentication portion 302 authenticates the route search information, initial setting information shown in FIG. 9 is preferably referred as appropriate. The initial setting information includes a title permission character string, a sender permission address, a main column permission character string, search performance information and other information, as shown in FIG. 9.

In the title permission character string, a character string for the judgement of its availability, such as a character string "destination", "on route position" or the like, is described. The mail authentication portion 302 judges the availability by comparing a character string described in a title column of a transmitted e-mail with a character string described in the title permission character string. That is, if a character string that is not described in the title permission character string is described in the title column of the e-mail, it is judged that the route search is not available.

Incidentally, in the title permission character string, a description condition or parameter of a character string or the like to be described in a title column may be described. That is, for example in the case that the date information is included as mentioned above, a judgement standard or baseline indicating whether or not the date information is described appropriately may be described.

In the sender permission address, an e-mail address of a user authorized to perform the route search is preferably described. That is, it is judged that the route search information is not available if the route search information in which an e-mail address that is not described in the sender permission address is included as the sender information, for example. Incidentally, in a navigation system including a plurality of navigation apparatuses 2, the sender permission address is preferably described for each navigation apparatus 2. For example, in the case shown in FIG. 9, sender addresses "airnaviusr@pioneer.co.jp" and "usr2003@pioneer.co.jp" are registered as sender addresses to be authenticated as available.

In the main column permission character string, a description condition or parameter of a character string or the like to be described in the main column may be described for example. Alternatively, in a construction of requiring a password corresponding to the sender information, authentication data or the like of the password may be included.

In the search performance information, whether or not the route search is to be performed is described. That is, if it is indicated that the route search is not to be performed, the server 3 does not perform the route search, even in a case that the route search information is transmitted.

Other information may be arranged to describe information for indicating other condition or parameter, or to describe information about additional condition or setting information, if exists.

In FIG. 7 again, if it is judged that the extracted information at step S12 is not able to be authenticated from the result of the authentication at the step S13 (step S13: No), i.e. if it is judged that the instruction is not from the authorized sender, the following processings are not performed and thereby the processings are terminated.

On the other hand, if it is judged that the extracted information at step S12 is able to be authenticated (step S13: Yes), i.e. if it is judged that the instruction is from the authorized sender, it is judged whether or not the route search setting is available (step S14).

As the result of this judgement, if it is judged that the route search setting is not available (step S14: No), i.e. if it is judged that the route search is not available on the basis of the route search information transmitted at the step S11, the following processings are not performed and thereby the processings are terminated.

Incidentally, if it is judged that the route search setting is not available at the step S14, an e-mail for informing this event may be sent to an e-mail address of the sender indicated by the sender information, to prompt to send again the proper route search information.

On the other hand, if it is judged that the route search setting is available (step S14: Yes), i.e. if it is judged that the route search is available on the basis of the route search information transmitted at the step S11, the search processing is prepared (step S15). More specifically, the route search portion 303 acquires the route search information, recognizes various kinds of information therein (or character string or the like), and prepares the search processing to make ready for transmitting the current position information (e.g. position information of a mobile body on which the navigation apparatus 2 is mounted) from the navigation apparatus 2. Furthermore, route search processing time may be shortened by acquiring in advance the map data or the like necessary for the route search or the like.

Incidentally in this case, for example, a predetermined departure position (e.g. a garage or home of the user, an office of the user and so on) may be defined as a default departure position (i.e. a current position), otherwise, for example, the route search information may include information indicating a departure position that may be inputted by the user himself/herself. Thereby, at the step S15, it is possible to perform the route search instantly, without waiting for the current position information transmitted from the navigation apparatus. Therefore, operation time on the vehicle or the like can be more reduced, as discussed later. These bring a greater advantage in a movement from the home to the destination, or in a delivery from a pickup or consolidating station in a delivery industry.

Incidentally, on the judgement at the step S14, in the case that information for identifying the destination is not described in the main column in spite of the description "destination" in the title column, preferably it is not judged that the route search information is available, because an appropriate route search is not performable. Alternatively, even if a nonrecognizable character string is included in the title column in the case that latitude and longitude for identifying the "destination" and the position thereof is described, preferably it is judged that the route search information is available, because the route search is performable.

Next, with reference to FIG. 10, an operational flow of actually performing the route search and display or outputting the result thereof will be discussed.

As shown in FIG. 10, for example, on a date when the route search is to be performed on the basis of the route search information transmitted at the step S11 in FIG. 7, the navigation apparatus 2 is powered on (step S21). Then, after powered on, the navigation apparatus 2 measures a current position of the navigation apparatus 2 from GPS radio waves 19 received at the GPS receiver 18. Then, the current position information indicating the measured current position is transmitted to the server 3 via the communication network 100 due to the operation of the communication device 38 (step S22).

Incidentally, in this case, if it is judged that the route search is not available at the step S13 or step S14 in FIG. 7, the current position information may not be transmitted. In this case, information (or an e-mail) indicating the judgement result may be preferably transmitted from the server 3 to the navigation apparatus 2 or the like. Alternatively, the current position information may be transmitted to the server 3 from the navigation apparatus 2, in the case that an instruction of transmitting the current position information (or information of indicating that the proper authentication of the e-mail is performed) is transmitted to the navigation apparatus 2 from the server 3.

Then, the server 3 that is preparing at the step S15 in FIG. 7 receives the current position information transmitted from the navigation apparatus 2, due to the operation of the communication portion 301. Then, the route search is performed, on the basis of the received current position information and the route search information received at the step S11 (step S23). Then, search result information indicating the result of the route search is transmitted to the navigation apparatus 2 via the communication network 100, due to the operation of the communication device 301.

The navigation apparatus 2 receives the search result information, due to the operation of the communication device 38 (step S24). Then, the optimal or appropriate route indicated by the received search result information is displayed or outputted on the display 44, and then the route guidance or the like is performed (step S25).

Thereby, the user is free from a bothering manipulation or the operation for the route search during a use of the vehicle (i.e. on actually driving), by preparing in advance a necessary manipulation or operation for the route search, prior to getting into the vehicle or the like. That is, designating a date of traveling by the vehicle from a personal computer at home for example and preparing a route search to the destination (i.e. transmitting the route search information) bring a great advantage of displaying the optimal or appropriate route, without a special setting for the route search during the use of the vehicle.

Additionally, for example in the delivery industry or the like, a necessary instruction may be transmitted from the information transmittance terminal 4, which may be disposed at a center for managing the delivery service, or at each pickup station or the like, to the navigation apparatus 2 mounted on a delivery truck or the like. Thereby, it is possible to manage intensively the truck operation or the like, and to achieve an efficient delivery service. Additionally, it is possible to indicate successively a new route, even during a normal delivery or picking and so on. Thereby, it is possible to achieve a more efficient delivery service capable of responding quickly and appropriately to a sudden pickup or a sudden deliver request or the like.

(Variant of First Example)

Figure 11:
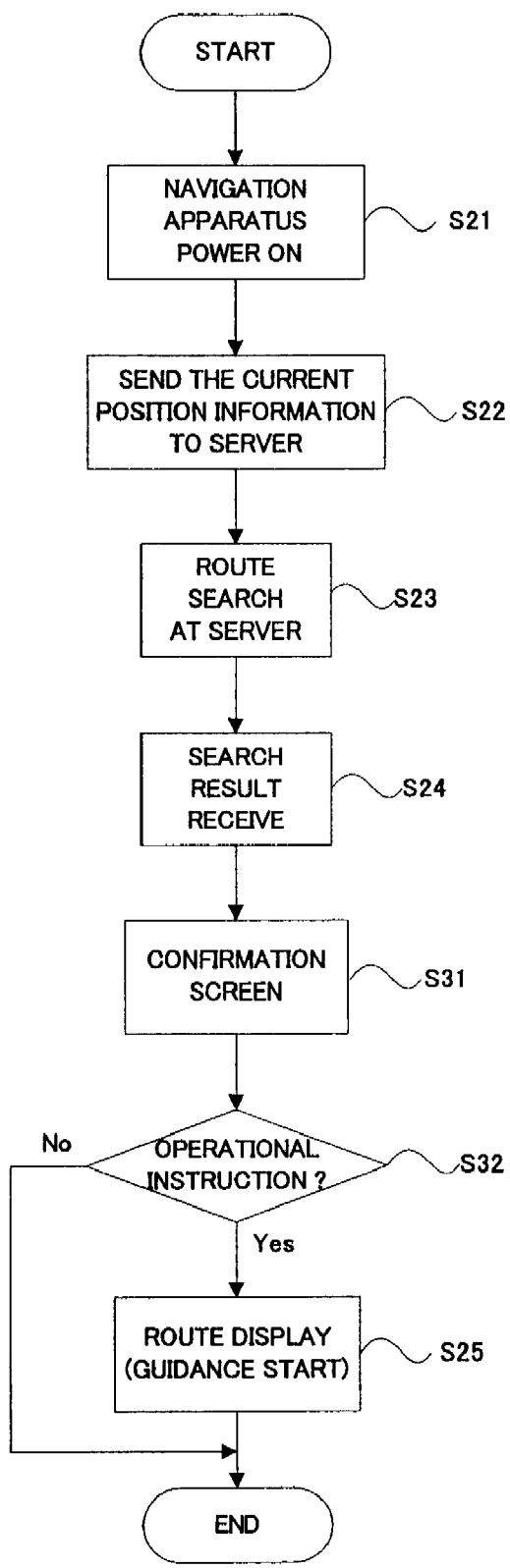
FIG. 11 is a flow chart illustrating another operational flow from the route search to the result output display in the first example of the navigation system according to the present invention.
Figure 12:
FIG. 12 is a schematic view illustrating a specific example of the display screen of the display of the navigation apparatus, in the first example of the navigation system according to the present invention.

Next, a variant of the first example will be discussed, with reference to FIG. 11 and FIG. 12. FIG. 11 is a flow chart illustrating an operational flow in this variant, from a "route search" to a "result display output", in the case that the third party other than the user of the navigation apparatus 2 transmits the route search information. FIG. 12 is a view illustrating a display screen on which the result of the route search is displayed/outputted.

In this variant, a confirmation screen is displayed prior to the display or output process of the step S25 in the aforementioned first example, in the case that a route search based on route search information from the third party other than the original user of the navigation apparatus 2 is allowed or permitted.

That is, in this variant, as shown in FIG. 11, the operational flow from step S21 to step S24 is processed as discussed above. Then, after receiving the search result information at the step S24, a confirmation screen to confirm whether or not a route based on the search result information is to be displayed is displayed/outputted (step S31).

The confirmation screen, as shown in FIG. 12 for example, is preferably capable of selecting whether or not the route is displayed. Additionally, the sender who sends the route search instruction (i.e. a sender indicated by sender information included in the route search information) is preferably indicated or displayed.

In FIG. 11 again, the navigation apparatus 2, on which the confirmation screen shown in FIG. 12 is displayed, judges whether or not there is a user's operational instruction (step S32). The operational instruction may be inputted via the input device 60.

As a result of this judgement, if there is a "not-to-display" operational instruction (step S32: No), the following processings are not performed and thereby the operational flow is terminated. On the other hand, if there is a "to-display" operational instruction (step S32: Yes), the route is displayed (step S25).

Therefore, it is possible to avoid a confusional state that may confuse the user by a sudden switching of the route, during a travel by vehicle or the like.

Conclusively, according to the first example of the navigation system including the variant thereof, it is possible to perform the route search at a desired time point, on the basis of the route search instruction reserved in advance by the user. Alternatively, it is possible to start the route search simultaneously or almost simultaneously with a start of the navigation apparatus or a start of the engine. Therefore, it is not necessary to perform settings for the route search, during an idling after getting into the vehicle or the like. As the result, an idling time can be reduced. Additionally, an efficient delivery service can be achieved, as mentioned above. Therefore, it brings a great advantage of achieving a "low emission challenge", a concern from the public interest in all the industries.

Incidentally, the same benefit as this first example can be brought, even though the operations of the route search portion 303 are performed by the navigation apparatus 2, instead of or in addition to the server 3. That is, the aforementioned operations of the route search portion 303 are performed by hardware or a program on the CPU 22 of the navigation apparatus 2.

Furthermore, information indicating a current position or a departure position necessary for the route search may be obtained by acquiring a dispatch site of the e-mail at the server 3 for example and defining the dispatch site as the departure position. Alternatively, route search information including a statement of assuming the dispatch site of the e-mail as the departure position may be transmitted at the information transmission terminal 4. Alternatively, in the case that a pair of "departure position" and "destination position" is included in the route search information, for example, information indicating the departure position may be inputted by the user via the information transmission terminal 4, and transmitted. In this arrangement, it is possible to complete the route search, without waiting for the start of the navigation apparatus 2 or the engine. Alternatively, information indicating a predetermined departure position may be transmitted from the navigation apparatus 2, independently of the GPS measurement or the like for example. That is, if the home or garage, otherwise the office is defined as the predetermined departure position, the route can be displayed quickly, on the start of the navigation apparatus or the engine. Thereby, the idling time can be reduced.

In the aforementioned first example, the variant of the first example, and the second example discussed below, the server 3 may extract map data relating to a part including the optimal route from a database of the server 3 as well as route data indicating the optimal route as the search result, and then transmit the extracted map data and the route data to the navigation apparatus 2. Then, at the navigation apparatus 2, a route guidance processing (i.e. route display on the displayed map) may be performed, on the basis of the received map data and the route data.

Second Example

Next, with reference to FIG. 13 to FIG. 16, the second example of the navigation system according to the present invention will be discussed. In the second example, authentication processing of the route search information may be performed at the navigation apparatus. Incidentally, in the second example, components the same as those of the first example carry the same reference number and step numerals and the detail explanation of them is omitted.

(Fundamental Construction of Second Example)

Figure 13:
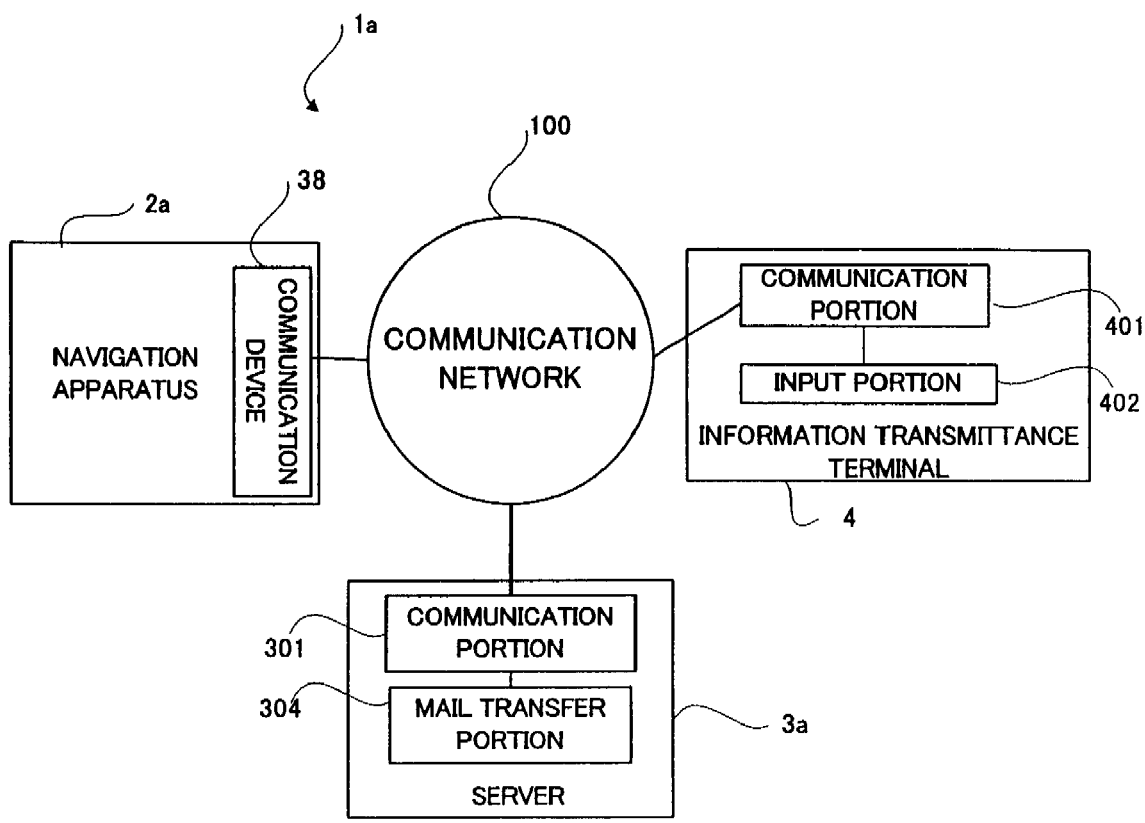
FIG. 13 is a block diagram illustrating a fundamental construction of the second example of the navigation system according to the present invention.

Firstly, with reference to FIG. 13, the fundamental construction of the second example will be discussed. FIG. 13 is a block diagram conceptually illustrating a fundamental construction of the second example of the navigation system according to the present invention.

As shown in FIG. 13, the navigation system 1a is provided with: a navigation apparatus 2a; a server 3a; and an information transmittance terminal 4.

The navigation apparatus 2a has the similar construction to the first example of the navigation apparatus 2 (see FIG. 6). Particularly in the second example, the mail authentication processing and the route search processing can be performed at the navigation apparatus 2. That is, these features may be embodied in the program operation on the CPU 22 (see FIG. 6), or may be embodied in hardware circuit such as an IC chip or the like.

The server 3a is provided with: a large or medium sized computer; a workstation; a personal computer and so on. More specifically, it is provided with: a communication portion 301; and a mail transfer portion 304.

The mail transfer portion 304 receives the route search information transmitted from the information transmittance terminal 4, and transmits (or transfers) the received route search information to the navigation apparatus 2a. On the other hand, in the case that the navigation apparatus 2a fails to receive the route search information (e.g. a case of not activated) for example, the route search information may be stored or saved, and then transmitted after the navigation apparatus 2a becomes a state capable of receiving the route search information for example.

(Operational Principle of Second Example)

Figure 14:
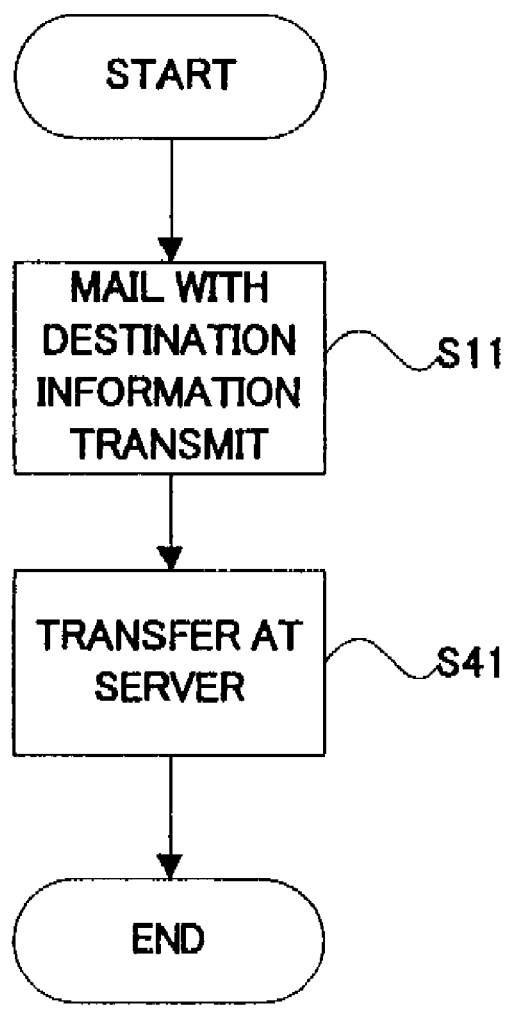
FIG. 14 is a flow chart illustrating an operational flow until the authentication processing of the route search information, in the second example of the navigation system according to the present invention.
Figure 15:
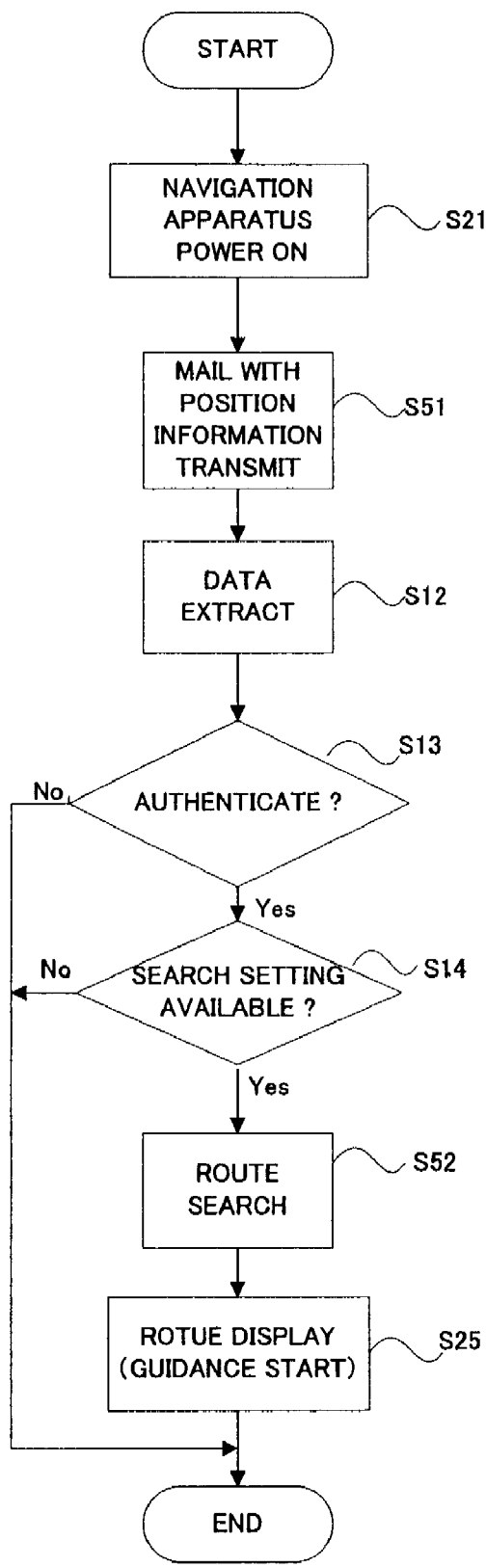
FIG. 15 is a flow chart illustrating an operational flow from the route search to the display output, in the second example of the navigation system according to the present invention
Figure 16:
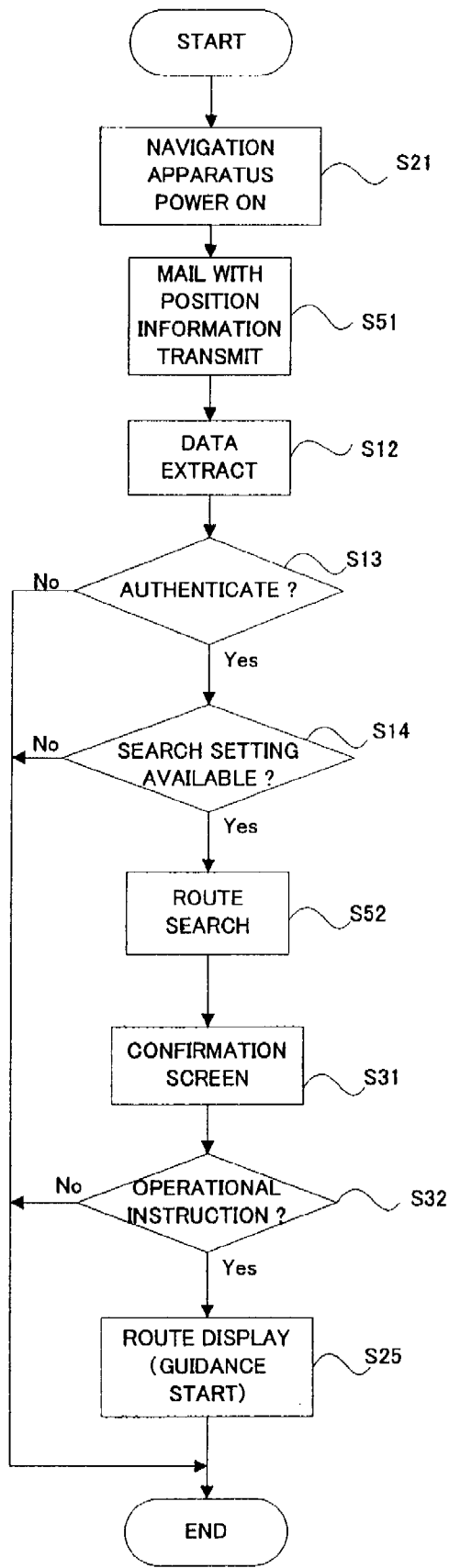
FIG. 16 is a flow chart illustrating another operational flow from the route search to the display output, in the second example of the navigation system according to the present invention.

Next, with reference to FIG. 14 to FIG. 16, the operational principle of the second example will be discussed. FIG. 14 is a flow chart illustrating an operational flow of authenticating the route search information. FIG. 15 is a flow chart illustrating an operational flow from route search to result display output. FIG. 16 is a flow chart illustrating an operational flow from route search to result display output, in the case that the third party other than the user of the navigation apparatus 2a transmits the route search information.

As shown in FIG. 14, an e-mail with destination information (i.e. route search information) is transmitted (step S11). Then, the e-mail is received at the server 3a. The server 3a then transmits the received e-mail to the navigation apparatus 2a, if the navigation apparatus 2a is in a state capable of receiving the e-mail (e.g. the navigation apparatus 2a is activated). On the other hand, if the navigation apparatus 2a is not in a state capable of receiving the e-mail (e.g. the navigation apparatus 2a is not activated), the e-mail is stored at the server 3a, and then transmitted to the navigation apparatus 2a after the navigation apparatus 2a becomes a state capable of receiving the e-mail (step S41).

Next, as shown in FIG. 15, the navigation apparatus 2a is activated or powered on (step S21). After activated, it receives an e-mail including the route search information (i.e. an e-mail with destination information) (step S51). Then, data is extracted from the route search information included in the received e-mail (step S12). Then, the authentication process is performed (step S13), and it is judged whether or not the search setting is available (step S14). If it is judged that these conditions are cleared (step S13: Yes and step S14: Yes), the navigation apparatus 2 acquires current position information indicating a current position by means of GPS, and performs the search processing (step S52). At this stage, the same processing as the route search portion 303 of the first example may be performed. Then, the result of the route search is displayed or outputted on or to the display 44 (step S25).

Incidentally, also in the second example, similarly to the first example, a confirmation screen may be displayed prior to the display/output, in the case that the route search based on the route search information from the third party other than the original user of the navigation apparatus 2*a* is allowed or permitted.

In this arrangement, as shown in FIG. 16, the operational flow from step S21 to step S52 is processed as mentioned above. Then, after the search processing is performed at the step S52, a confirmation screen to confirm whether or not the route which is based on the search result is to be displayed is displayed or outputted (step S31). The confirmation screen may display the display screen shown in FIG. 12.

Then, it is judged whether or not there is an operational instruction of the user (step S32). If there is the operational instruction (step S32: Yes), the route is displayed (step S25).

Conclusively, according to the second example of the navigation system, a benefit similar to that of the first example of the navigation system can be achieved. Additionally, the user can transmit the route search information at a desired time point, since the server stores the route search information, even in the case that the navigation apparatus is not in a state capable of receiving the route search information.

Incidentally, a benefit similar to this second example can be achieved, even in the case that the server 3*a*, instead of or in addition to the navigation apparatus 2*a*, performs the operations of the route search portion 303. That is, the operations of the route search portion 303 mentioned above may be performed by hardware or a program on the CPU 22 of the server 3.

Third Example

Next, with reference to FIG. 17 to FIG. 19, the third example of the navigation system will be discussed. In the third example, a current position of the information transmittance terminal is measured, and a route search is performed under assumption in which the measured current position is defined a departure position for the route search.

(Fundamental Construction of Third Example)

Firstly, with reference to FIG. 17, the fundamental construction of the third example of the navigation system will be discussed. FIG. 17 is a block diagram conceptually illustrating a fundamental construction of the third example of the navigation system.

Figure 17:
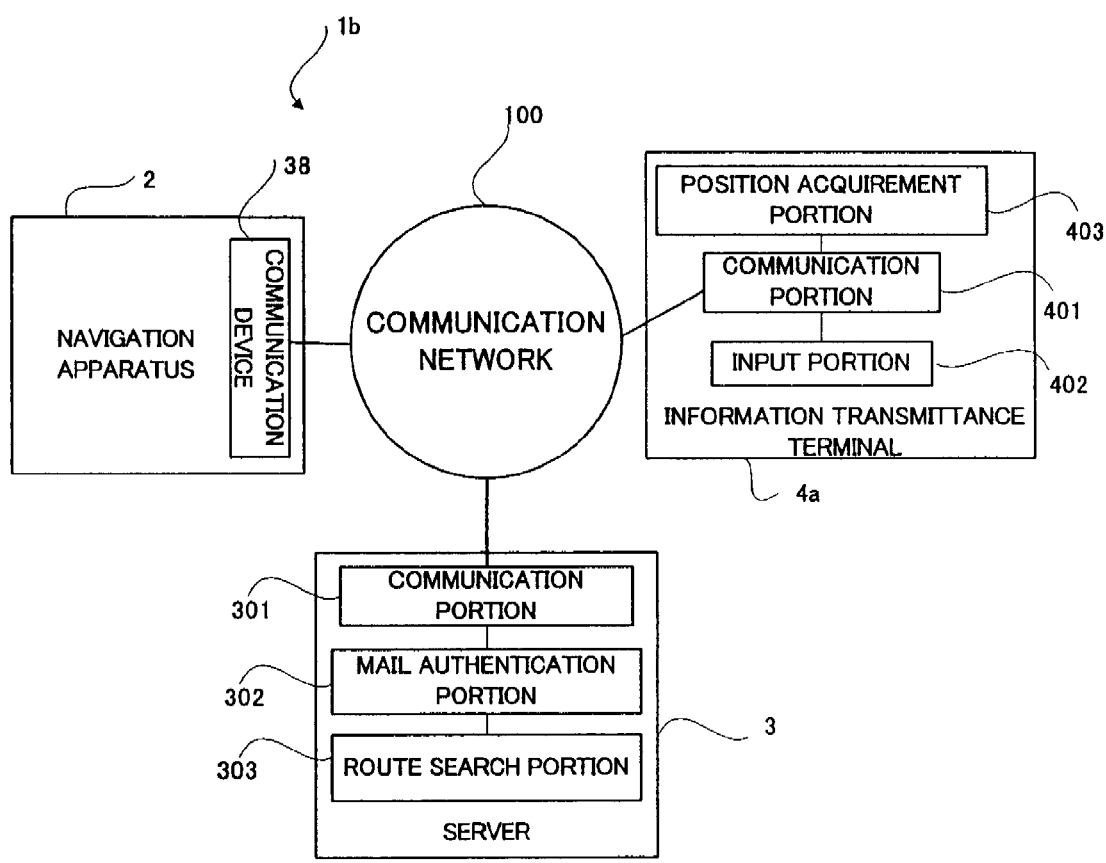
FIG. 17 is a block diagram illustrating a fundamental construction of the third example of the navigation system according to the present invention.

As shown in FIG. 17, the navigation system 1*b* is provided with: a navigation apparatus 2; a server 3; and an information transmittance terminal 4*a*.

The information transmittance terminal 4*a* may include a cell phone, a personal computer, a PDA and so on, and more specifically, a communication portion 401, an input portion 402 and a position acquirement portion 403.

The position acquirement portion 403 is arranged to acquire a position of the information transmittance terminal 4*a*. For example, it may be arranged to acquire a current position by receiving radio waves from GPS satellites. If the information transmittance terminal 4*a* is a cell phone, the current position may be acquired by information from a base station or relay station where radio waves are relayed. Alternatively, the position information or departure position information may be inputted by the user through the input portion 402.

Alternatively, a position of the information transmittance terminal 4*a* may be acquired at the server 3. In this case, for example, the position of the information transmittance terminal 4*a* may be acquired, on the basis of an identification code (e.g. telephone number, IP address or the like) in the communication network 100 that connects the information transmittance terminal 4*a* with the server 3. Alternatively, the position of the information transmittance terminal 4*a* may be estimated on the basis of the relay line or backbone line, and the estimated position may be defined or assumed as the position of the information transmittance terminal 4*a*.

(Operational Principle of Third Example)

Next, with reference to FIG. 18 and FIG. 19, the operation of the third example of the navigation system will be discussed. FIG. 18 is a flow chart illustrating an operational flow of authenticating the route search information. FIG. 19 is a flow chart illustrating an operational flow from route search to result display output.

Figure 18:
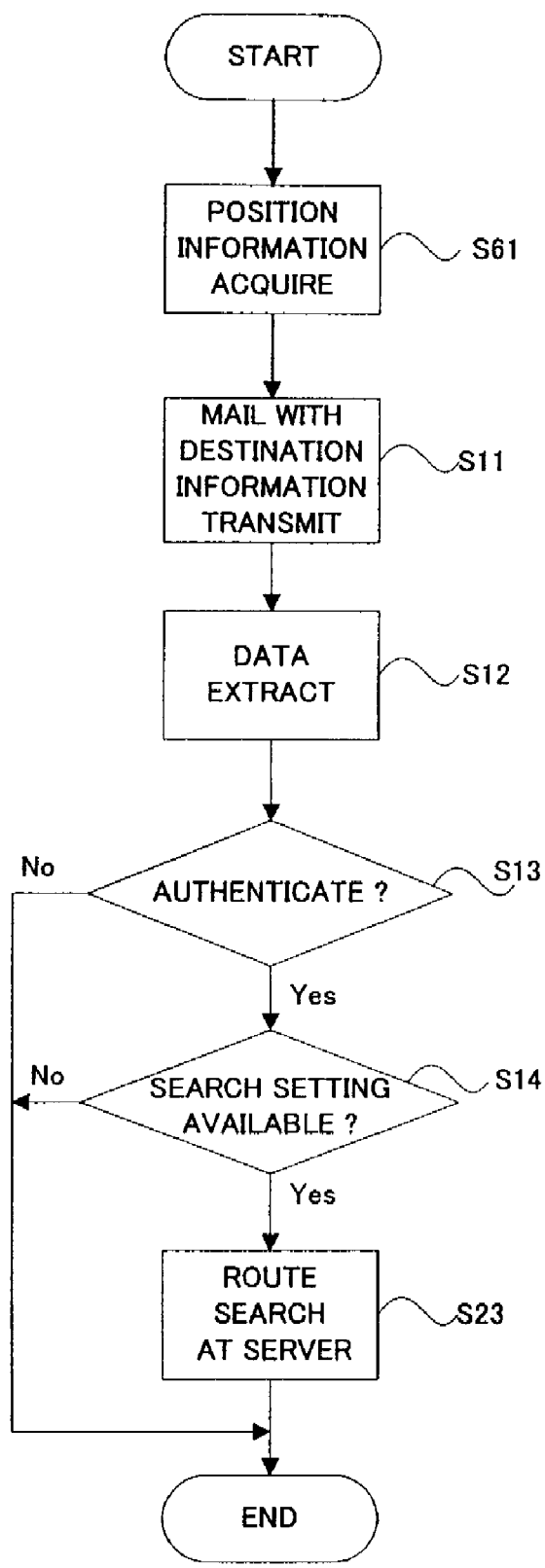
FIG. 18 is a flow chart illustrating an operational flow until the route search processing, in the third example of the navigation system according to the present invention.

As shown in FIG. 18, the information transmittance terminal 4*a* measures a current position of the information transmittance terminal 4*a*, due to operations of the position acquirement portion 403, and acquires position information indicating the current position (step S61).

Then, a mail with destination information (i.e. route search information) including the position information acquired at the step S61 is transmitted to the server 3 (step S11). The position information is preferably included as departure information in the route search information. Alternatively, the position information may be generated as departure information, independently of the route search information.

Then, data is extracted from the route search information at the server (step S12), it is judged whether or not the authentication is available (step S13), and it is further judged whether or not the route setting is available (step S14), if the authentication is available (step S13: Yes). If the search setting is available (step S14: Yes), the route search is performed, on the basis of the departure information and the destination information included in the route search information (step S23).

Figure 19:
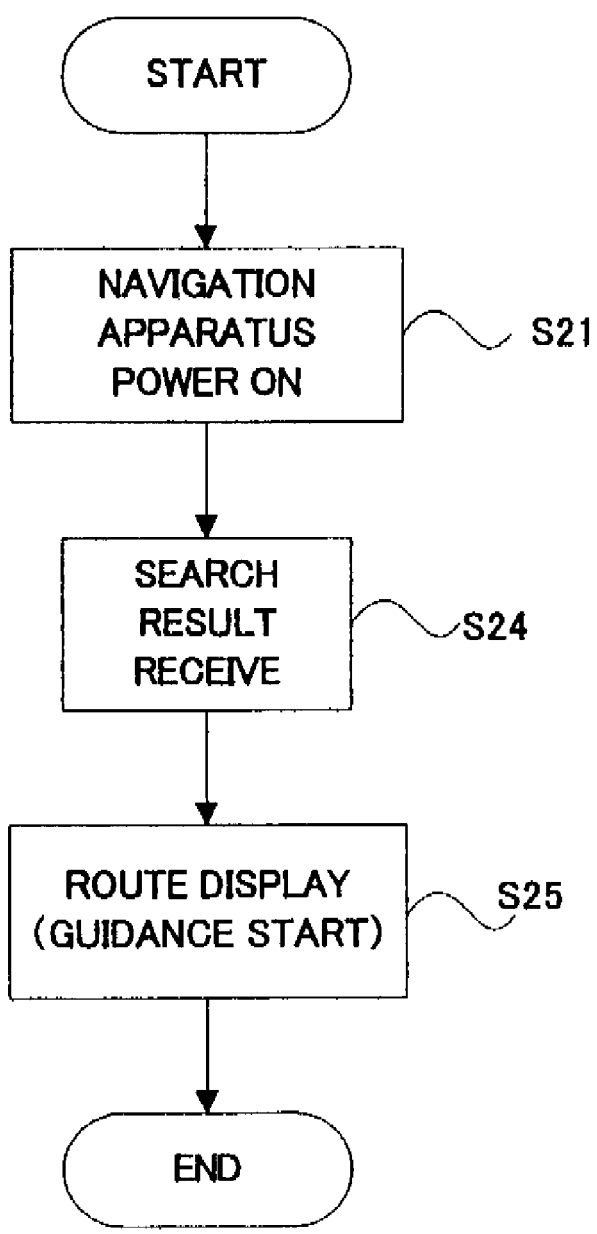
FIG. 19 is a flow chart illustrating an operational flow from the route search to the display output, in the third example of the navigation system according to the present invention.

Next, as shown in FIG. 19, the navigation apparatus 2 is activated or powered on (step S21). After activated, it receives the search result information from the server 3 (step S24), and displays the route on the display 44, and then starts the route guidance (step S25).

Thereby, for example, if the user at his/her home transmits in advance the route search information (especially, the route search information including the departure information and the destination information) by means of his/her cell phone or the like prior to or immediately prior to outgoing, the route search will be completed at the server 3, by a time when the user actually goes out. Thereby, if the user starts the engine as usual, an appropriate route is displayed on the navigation apparatus 2. Therefore, the operations for route search can be reduced or eliminated, during idling.

Alternatively, a satisfactory benefit can be achieved, by transmitting a predetermined position such as home, office, or pick up station in the case of delivery service, as a default departure position included in the route search information.

Conclusively, according to the third example of the navigation system, the server 3 can perform the route search simultaneously with receiving the route search information for example. Therefore, it is possible to receive the result of the route search simultaneously with starting engine or navigation, and to start the route guidance quickly. That is, it is possible to substantially eliminate the operations to be done during idling for example after getting into the vehicle. Therefore, the idling time can be more shortened, and the benefit like as that of the first and second example can be achieved.

Incidentally, in the aforementioned first, second and third example, the navigation apparatus 2 and the information transmittance terminal 4, which are connected to the server 3, are all shown respectively as a single in their numeral. Nevertheless, even if a plurality of navigation apparatuses 2 and information transmittance terminals 4 (i.e. used by one or more persons) are connected, the aforementioned benefit can be achieved.

Furthermore, the navigation system according to the present invention is applicable not only to vehicles as discussed in the aforementioned various aspects, various embodiments, or various example but also to various navigation systems for various mobile bodies including airplanes, shipping, motorcycles and so on, for a pedestrian or animal equipped with a cell phone, a PDA and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-200065 filed on Jul. 22, 2003 including the specification, claims, drawings and summary is incorporated herein by reference in its entirety.

What is claimed is:

1. A navigation system having a navigation apparatus, a server apparatus and a route information transmittance apparatus, which are capable of transferring and receiving information in bidirectional inter-communication via a communication network,
   (i) said route information transmittance apparatus comprising:
      an input device for inputting route search information which includes destination information and is required for performing a route search; and
      a transmittance device for transmitting the inputted route search information to said server apparatus,
   (ii) said server apparatus comprising:
      a server side communication device for receiving the route search information transmitted from said route information transmittance apparatus;
      an authentication device for judging whether or not the destination information is appropriately authorized to perform the route search and identifies appropriately the destination position in performing the route search; and
      a search device for performing the route search on the basis of the route search information which is judged to identify appropriately the destination position in the case where the destination information is judged to identify appropriately the destination position in performing the route search, wherein said server side communication device further transmits search result information indicating a route searched by said search device to said navigation apparatus, and
   (iii) said navigation apparatus comprising:
      a terminal side communication device for receiving the search result information; and
      a route guidance device for performing a route guidance on the basis of the received search result information.

2. The navigation system according to claim 1, said navigation apparatus further comprising a measurement device for measuring a current position of a movable body on which said navigation apparatus is mounted, wherein said terminal side communication device transmits movable body position information indicating the measured position to said server apparatus, said server side communication device receives the movable body position information, and said search device performs the route search on the basis of the route search information which is judged to identify appropriately the destination position and the received movable body position information.

3. The navigation system according to claim 2, wherein said terminal side communication device transmits the movable body position information, after the route search information is judged to identify appropriately the destination position.

4. The navigation system according to claim 1, said route information transmittance apparatus or said server apparatus further comprising a position identification device for identifying a current position of said route information transmittance apparatus, wherein said search device performs the route search, on the basis of the route search information which is judged to identify appropriately the destination position, under an assumption in which the identified position is simulated as a current position of a movable body on which said navigation apparatus is mounted.

5. The navigation system according to claim 1, wherein said authentication device judges that the route search information is available, if the destination information which is included in the route search information includes a character string recognizable by said search device.

6. The navigation system according to claim 1, wherein said authentication device includes a storing device for storing initial setting information, and judges whether or not the route search information identifies appropriately the destination position, with reference to the initial setting information and the route search information.

7. The navigation system according to claim 1, wherein the route search information includes sender information indicating a sender who transmits the route search information.

8. The navigation system according to claim 1, wherein the route search information includes search object information designating said navigation apparatus for which the route search is performed on the basis of the route search information.

9. The navigation system according to claim 1, wherein the route search information further includes "on route site", and said authentication device further judges whether or not the "on route site" information identifies appropriately the position of a "on route site" in performing the route search.

10. The navigation system according to claim 1, wherein the route search information further includes date information indicating at least one of date and time point when said search device performs the route search on the basis of the route search information, and said authentication device further judges whether or not the date information identifies appropriately at least one of date and time point in performing the route search.

11. The navigation system according to claim 1, said navigation apparatus further comprising a display confirmation device for confirming whether or not a result of the route search is to be displayed and/or outputted.

12. A navigation method in a navigation system having a navigation apparatus, a server apparatus and a route information transmittance apparatus, which are capable of transferring and receiving information in bidirectional inter-communication via a communication network,
   (i) at said route information transmittance apparatus, said method comprising:
      an input process of inputting route search information which includes destination information and is required for performing a route search; and
      a transmittance process of transmitting the inputted route search information to said server apparatus, (ii) at said server apparatus, said method comprising:

a server side communication process of receiving the route search information transmitted at said transmittance process;

an authentication process of judging whether or not the destination information is appropriately authorized to perform the route search and identifies appropriately the destination position in performing the route search; and a search process of performing the route search on the basis of the route search information which is judged to identify appropriately the destination position in the case where the destination information is judged to identify appropriately the destination position in performing the route search, wherein at said server communication process, search result information indicating a route searched at said search process is further transmitted to said navigation apparatus, and (iii) at said navigation apparatus, said method comprising:

a terminal side communication process of receiving the search result information; and a route guidance process of performing a route guidance on the basis of the received search result information.

13. A computer program product in a computer-readable medium for tangibly embodying a program of instructions executable by a computer provided for a navigation system having a navigation apparatus, a server apparatus and a route information transmittance apparatus, which are capable of transferring and receiving information in bidirectional intercommunication via a communication network, (i) said route information transmittance apparatus comprising:

an input device for inputting route search information which includes destination information and is required for performing a route search; and a transmittance device for transmitting the inputted route search information to said server apparatus, (ii) said server apparatus comprising:

a server side communication device for receiving the route search information transmitted from said route information transmittance apparatus;

an authentication device for judging whether or not the destination information is appropriately authorized to perform the route search and identifies appropriately the destination position in performing the route search; and a search device for performing the route search on the basis of the route search information which is judged to identify appropriately the destination position in the case where the destination information is judged to identify appropriately the destination position in performing the route search, wherein said server communication device further transmits search result information indicating a route searched by said search device to said navigation apparatus, and (iii) said navigation apparatus comprising:

a terminal side communication device for receiving the search result information; and a route guidance device for performing a route guidance on the basis of the received search result information, wherein the program of instructions is to make the computer function as at least one of device which is comprised in each of said navigation apparatus said server apparatus and said route information transmittance apparatus.

* * * * *